United States Patent
Lee et al.

(10) Patent No.: US 10,744,967 B2
(45) Date of Patent: Aug. 18, 2020

(54) AUTONOMOUS VEHICLE

(71) Applicant: LG Electronics Inc., Seoul (KR)

(72) Inventors: Jinkyo Lee, Seoul (KR); Ilho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 15/720,468

(22) Filed: Sep. 29, 2017

(65) Prior Publication Data
US 2018/0093631 A1  Apr. 5, 2018

(30) Foreign Application Priority Data

Sep. 30, 2016 (KR) .................. 10-2016-0126644

(51) Int. Cl.
*B60R 21/015* (2006.01)
*B60W 50/08* (2020.01)
(Continued)

(52) U.S. Cl.
CPC ........ *B60R 21/01552* (2014.10); *B60K 28/04* (2013.01); *B60R 21/01512* (2014.10); *B60R 21/01538* (2014.10); *B60W 30/025* (2013.01); *B60W 30/06* (2013.01); *B60W 30/085* (2013.01); *B60W 30/095* (2013.01); *B60W 40/08* (2013.01); *B60W 50/082* (2013.01); *G06K 9/00791* (2013.01); *G06K 9/00805* (2013.01); *G06K 9/00838* (2013.01); *G06K 9/00845* (2013.01); *G08G 1/166* (2013.01); *B60H 1/00742* (2013.01);
(Continued)

(58) Field of Classification Search
CPC .............. B60R 21/00; B60R 21/01512; B60R 21/01552; B60R 21/01538; B60R 16/0231; B60R 11/04; B60W 30/025
See application file for complete search history.

(56) References Cited

U.S. PATENT DOCUMENTS 5,602,425 A     2/1997  Wilhelmi et al.
6,138,071 A *  10/2000  Sekine ................ B60K 31/042
                                                    180/170

(Continued)

FOREIGN PATENT DOCUMENTS

DE   102007012507    9/2008
DE   102008028844    1/2009

(Continued)

OTHER PUBLICATIONS

Nyholm et al., "The Ethics of Accident-Algorithms for Self-Driving Cars: an Applied Trolley Problem?," Ethical Theory Moral Practice, 19(5):1275-1289 (Jul. 2016).

(Continued)

*Primary Examiner* — Hunter B Lonsberry
*Assistant Examiner* — Luis A Martinez Borrero
(74) *Attorney, Agent, or Firm* — Fish & Richardson P.C.

(57) ABSTRACT

A vehicle that operates in an autonomous driving mode and includes: an occupant sensing unit that is configured to sense an occupant inside the vehicle; and at least one processor configured to: determine, through the occupant sensing unit, whether the vehicle is occupied; and in a state in which the vehicle operates in the autonomous driving mode, control one or more in-vehicle devices based on a determination of whether the vehicle is occupied.

19 Claims, 29 Drawing Sheets

(51) Int. Cl.
  *B60K 28/04*     (2006.01)
  *G06K 9/00*      (2006.01)
  *B60W 30/085*    (2012.01)
  *B60W 30/02*     (2012.01)
  *B60W 30/095*    (2012.01)
  *G08G 1/16*      (2006.01)
  *B60W 30/06*     (2006.01)
  *B60W 40/08*     (2012.01)
  *B60H 1/00*      (2006.01)
  *B60W 50/00*     (2006.01)

(52) U.S. Cl.
  CPC ............ *B60W 2040/0881* (2013.01); *B60W 2050/007* (2013.01); *B60W 2050/0095* (2013.01); *B60W 2710/24* (2013.01)

(56) References Cited

U.S. PATENT DOCUMENTS

| | | | |
|---|---|---|---|
| 6,194,856 B1* | 2/2001 | Kobayashi | H02M 7/003 318/432 |
| 9,008,914 B2* | 4/2015 | Akiyama | B60T 7/12 701/41 |
| 9,381,915 B1 | 7/2016 | Elfizy et al. | |
| 9,415,658 B1* | 8/2016 | Makkar | B60G 17/0165 |
| 9,517,767 B1* | 12/2016 | Kentley | B60Q 1/26 |
| 9,786,154 B1* | 10/2017 | Potter | B60W 40/09 |
| 9,786,181 B2* | 10/2017 | Jo | F02D 41/403 |
| 9,950,708 B1* | 4/2018 | Cullinane | B60W 30/095 |
| 10,025,899 B2* | 7/2018 | Tarte | B60Q 1/143 |
| 10,246,089 B2* | 4/2019 | Sasabuchi | B60W 10/18 |
| 10,324,463 B1* | 6/2019 | Konrardy | B60W 50/082 |
| 10,358,120 B2* | 7/2019 | Takase | B60T 7/042 |
| 10,384,601 B1* | 8/2019 | Ricketts | B60W 50/14 |
| 10,386,192 B1* | 8/2019 | Konrardy | B60R 25/255 |
| 2009/0192710 A1* | 7/2009 | Eidehall | B62D 15/0265 701/301 |
| 2009/0206650 A1* | 8/2009 | Ninoyu | B60T 13/588 303/3 |
| 2014/0244106 A1* | 8/2014 | Singer | G06F 17/00 701/36 |
| 2014/0350785 A1* | 11/2014 | Tsuchida | B60W 30/0956 701/36 |
| 2015/0073652 A1* | 3/2015 | Bennie | B60W 50/00 701/36 |
| 2015/0232097 A1* | 8/2015 | Luther | B61L 3/006 701/123 |
| 2016/0328976 A1* | 11/2016 | Jo | B60W 30/182 |
| 2016/0339888 A1* | 11/2016 | Yokoyama | B60T 7/042 |
| 2017/0053532 A1* | 2/2017 | Madas | G08G 1/163 |
| 2017/0212525 A1* | 7/2017 | Wang | G01C 21/3492 |
| 2017/0277182 A1* | 9/2017 | May | B60W 50/082 |
| 2017/0329329 A1* | 11/2017 | Kamhi | B60W 40/08 |
| 2017/0364629 A1* | 12/2017 | Tarte | B60N 2/002 |
| 2017/0369073 A1* | 12/2017 | Huber | B60W 30/16 |
| 2018/0050664 A1* | 2/2018 | Tarte | B60R 25/31 |
| 2018/0088572 A1* | 3/2018 | Uchida | B60W 50/082 |
| 2018/0372504 A1* | 12/2018 | Singhal | G08G 1/0145 |
| 2019/0143964 A1* | 5/2019 | Zuckerman | B60R 21/00 701/23 |
| 2019/0250623 A1* | 8/2019 | Kentley-Klay | B60W 10/04 |
| 2020/0031363 A1* | 1/2020 | Xiang | B60W 50/10 |
| 2020/0047745 A1* | 2/2020 | Suzuki | G05D 1/0088 |

FOREIGN PATENT DOCUMENTS

| | | |
|---|---|---|
| DE | 102009045921 | 4/2011 |
| DE | 102014204168 | 9/2015 |
| DE | 102014013692 | 3/2016 |
| JP | 2000095130 | 4/2000 |
| JP | 2000293799 | 10/2000 |
| JP | 2001001787 | 1/2001 |
| JP | 2009138923 | 6/2009 |
| JP | 2010173441 | 8/2010 |
| KR | 10-2014-0043536 | 4/2014 |
| KR | 10-2014-0128800 | 11/2014 |
| KR | 10-2015-0003007 | 1/2015 |
| KR | 10-2015-0112219 | 10/2015 |
| KR | 2016054926 A | 5/2016 |
| KR | 101646134 | 8/2016 |
| WO | 2006/045259 | 5/2006 |

OTHER PUBLICATIONS

Search Report in European Patent Application No. 17001611.7, dated Aug. 6, 2018, 17 pages.
Partial European Search Report in European Application No. 17001611.7, dated Mar. 14, 2018, 12 pages.

\* cited by examiner (a)  (b)

(a)            (b)

(a)                  (b)

FIG. 10
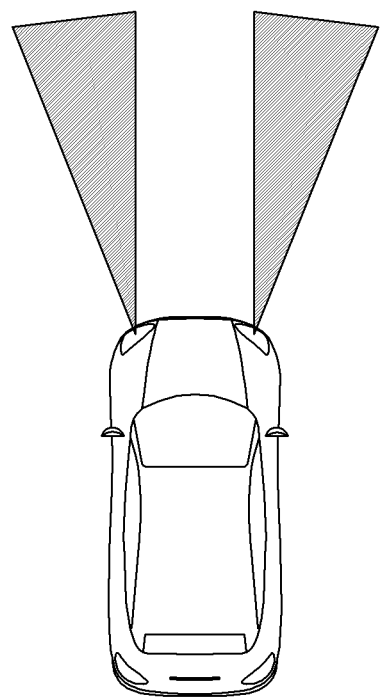
(a)
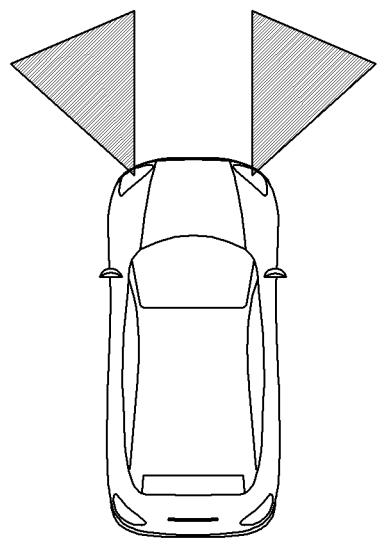
(b)

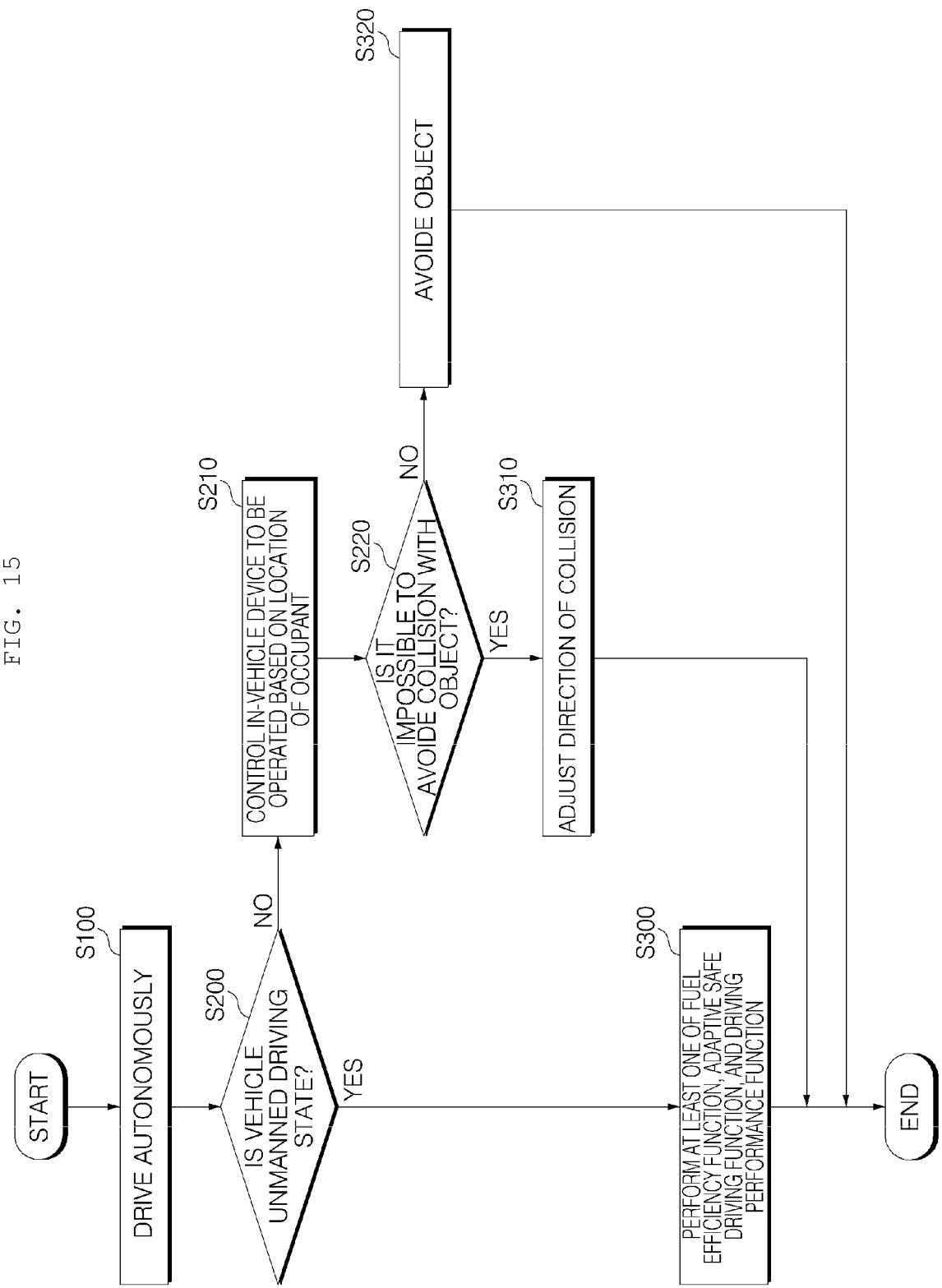

AUTONOMOUS VEHICLE

CROSS-REFERENCE TO RELATED APPLICATION

This application claims the priority benefit of Korean Patent Application No. 10-2016-0126644, filed on Sep. 30, 2016 in the Korean Intellectual Property Office, the content of which is incorporated by reference herein in its entirety.

TECHNICAL FIELD

The present application generally relates to an autonomous vehicle.

BACKGROUND

A vehicle is an apparatus that moves in a direction desired by a user riding therein. A representative example of a vehicle may be an automobile.

In some implementations, a variety of sensors and electronic devices have been mounted in vehicles for the convenience of a user who uses the vehicle. In particular, for user driving convenience, an Advanced Driver Assistance System (ADAS) has been actively studied. In addition, enormous efforts have been being made to develop autonomous vehicles.

SUMMARY

In general, one innovative aspect of the subject matter described in this specification can be implemented in a vehicle that operates in an autonomous driving mode, the vehicle including: an occupant sensing unit that is configured to sense an occupant inside the vehicle; and at least one processor configured to: determine, through the occupant sensing unit, whether the vehicle is occupied; and in a state in which the vehicle operates in the autonomous driving mode, control one or more in-vehicle devices based on a determination of whether the vehicle is occupied.

The foregoing and other implementations can each optionally include one or more of the following features, alone or in combination. In particular, one implementation includes all the following features in combination.

The at least one processor is configured to: based on a determination that the vehicle is in an unmanned driving state in which the vehicle operates in the autonomous driving mode and the vehicle is not occupied, operate the one or more in-vehicle devices according to the unmanned driving state.

The at least one processor is configured to: based on the vehicle being in the unmanned driving state, control the one or more in-vehicle devices to perform at least one of a fuel efficiency task, a safe driving task, or a driving performance task.

The at least one processor is configured to: based on the vehicle being in the unmanned driving state, deactivate at least one in-vehicle device among the one or more in-vehicle devices based on a determination of whether the vehicle is occupied, the at least one in-vehicle device including at least one of: a user interface apparatus, a driving manipulation apparatus, a safety apparatus drive unit, a lamp drive unit, an air-conditioner drive unit, a wiper drive unit, a side mirror drive unit, or an electronic control suspension, wherein the at least one processor is configured to: perform the fuel efficiency task by deactivating at least one of the user interface apparatus, the driving manipulation apparatus, the lamp drive unit, the air-conditioner drive unit, the wiper drive unit, the side mirror drive unit, or the electronic control suspension; and perform the safe driving task by deactivating the safety apparatus drive unit.

The at least one processor is configured to: based on the vehicle being in the unmanned driving state, control at least one of a light intensity or an irradiation range of at least one lamp of the vehicle based on a sensing range of one or more sensors of the vehicle.

The at least one processor is configured to: based on the vehicle being in the unmanned driving state, control an intervention rate of a regenerative brake system of the vehicle.

The at least one processor is configured to: based on the vehicle being in the unmanned driving state, control an Adaptive Cruise Control speed of the vehicle to operate the vehicle at engine RPM values for which a fuel consumption of the vehicle satisfies a threshold value.

The at least one processor is configured to: based on the vehicle being in the unmanned driving state, and based on a determination that the vehicle is likely to collide with at least one of a first object or a second object: determine a first importance level for the first object and a second importance level for the second object, and control the vehicle to prioritize avoiding colliding with the first object over the second object based on the first importance level being greater than the second importance level.

The at least one processor is configured to: based on the first importance level of the first object being the same as the second importance level of the second object: control the vehicle to prioritize avoiding colliding with the first object over the second object based on a determination that colliding with the first object will cause a first impact to an engine or battery of the vehicle that is greater than a second impact to the engine or battery caused by colliding with the second object.

The at least one processor is configured to: based on the vehicle being in the unmanned driving state, and based on a determination that the vehicle is unable to avoid a collision with an object, control the vehicle to operate an engine brake of the vehicle and to deactivate a safety apparatus drive unit of the vehicle, and based on the vehicle being in the unmanned driving state, and based on a determination that snow or liquid is present on a road on which the vehicle travels, control the vehicle to operate the engine brake of the vehicle.

The at least one processor is configured to: based on a determination that the vehicle is occupied, control a suspension of the vehicle to be a first suspension level that is more flexible than a second suspension level corresponding to the vehicle being unoccupied.

The at least one processor is configured to: based on the vehicle being in an automatic parking mode, control a timing of a decelerating operation of the automatic parking mode based on the determination of whether the vehicle is occupied, wherein, in a state in which the vehicle is occupied, a first timing of the decelerating operation of the automatic parking mode is earlier than a second timing of the decelerating operation of the automatic parking mode in a state in which the vehicle is unoccupied.

The at least one processor is configured to: in the state in which the vehicle operates in the autonomous driving mode, control a timing of a decelerating operation of the autonomous driving mode based on the determination of whether the vehicle is occupied, wherein, in a state in which the vehicle is occupied, a first timing of the decelerating operation of the autonomous driving mode is later than a second timing of the decelerating operation of the autonomous driving mode in a state in which the vehicle is unoccupied.

The at least one processor is configured to: control a speed variation per unit time during an accelerating operation or a decelerating operation the vehicle based on the determination of whether the vehicle is occupied, wherein, in a state in which the vehicle is occupied, a first speed variation per unit time of the accelerating operation or the decelerating operation is smaller than a second speed variation per unit time of the accelerating operation or the decelerating operation in a state in which the vehicle is unoccupied.

The at least one processor is configured to: based on a determination that the vehicle is occupied: control the one or more in-vehicle devices based on a location of an occupant inside the vehicle; and activate at least one of a user interface apparatus, a driving manipulation apparatus, a safety apparatus drive unit, or an air-conditioner drive unit based on the location of the occupant inside the vehicle.

The at least one processor is configured to: based on the determination that the vehicle is occupied and based on a determination that the vehicle is unable to avoid a collision with an object, adjust a traveling direction of the vehicle based on the location of the occupant inside the vehicle.

The at least one processor is configured to: based on the vehicle being in the unmanned driving state, transmit, to an external terminal, information regarding at least one of a location, a driving condition, a route, or a driving environment of the vehicle; and based on a determination of an emergency situation of the vehicle, transmit, to the external terminal, information regarding the emergency situation.

The at least one processor is configured to: based on the vehicle being in the unmanned driving state, and based on a determination that a user is likely to board the vehicle: perform a first control operation at least one of the one or more in-vehicle devices including a user interface apparatus, a driving manipulation apparatus, an air-conditioner drive unit, a wiper drive unit, or a side mirror drive unit, wherein the first control operation is based on at least one of an estimated boarding time of the user, a preset temperature for the user, or a boarding location of the user.

The at least one processor is configured to: based on the vehicle being in the unmanned driving state, control the vehicle to unlock a locked door of the vehicle based on a determination that a first user is authorized to board the vehicle according to boarding authorization information acquired through a user interface apparatus or a communication apparatus of the vehicle.

The vehicle further includes: an output unit configured to display information, wherein the at least one processor is configured to: in the state in which the vehicle operates in the autonomous driving mode and based on a determination that the vehicle is occupied by a first user sitting in a driver's seat of the vehicle, control the output unit to display a query asking whether to switch from the autonomous driving mode to a manual driving mode; and based on receiving an input to switch from the autonomous driving mode to the manual driving mode: determine whether the first user is allowed to drive based on at least one of driving authorization information indicating whether the first user is authorized to drive the vehicle, or driving condition information indicating a physical condition of the first user; and based on a determination that the first user is allowed to drive, switch from the autonomous driving mode to the manual driving mode.

The subject matter described in this specification can be implemented in particular examples so as to realize one or more of the following advantages. An autonomous vehicle can inactivate one or more in-vehicle devices when an occupant does not exist inside the autonomous vehicle to save energy such that improve the fuel efficiency of the autonomous vehicle. In addition, the autonomous vehicle can control the in-vehicle devices based on a location or a condition of an occupant such that improve user experience.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

FIG. 10 is a diagram illustrating an example autonomous vehicle that performs a fuel efficiency task by controlling a lamp drive unit or a lamp of the vehicle;

FIG. 15 is a flowchart illustrating an example method for an autonomous vehicle to control one or more in-vehicle devices;

Like reference numbers and designations in the various drawings indicate like elements.

DETAILED DESCRIPTION

An autonomous vehicle typically performs various driving operations without control of a driver, and in some scenarios, without an occupant inside the vehicle.

For autonomous vehicles that operate without an on-board occupant, there may be less need to operate an in-vehicle device provided for the sake of occupants' convenience or safety. In addition, while driving, an autonomous vehicle without an on-board occupant may place more emphasis on safety of those outside the vehicle.

Implementations described herein control a device of an autonomous vehicle based on presence or absence of an occupant in the vehicle. In some implementations, an autonomous vehicle inactivates a device in the absence of an occupant, thus performing a fuel efficiency function or an adaptive safe driving function. The autonomous vehicle may also control an in-vehicle device in a different manner based on a location or condition of an occupant, when the occupant is present in the vehicle.

In some scenarios, the autonomous vehicle may control at least one in-vehicle device in the absence of an occupant so as to improve driving performance rather than ride comfort or driving safety.

Some implementations may have one or more of the following effects.

First, by controlling a device in a different manner based on presence or absence of an occupant in a vehicle, the vehicle may improve energy efficiency.

Second, when there is no occupant in an autonomous vehicle, human lives outside the vehicle may be considered the most important factor in a safety-related situation, and an unnecessary safety apparatus for protecting the vehicle itself may be prevented from being operated.

Third, when there is no occupant in an autonomous vehicle, the vehicle may improve driving performance rather than ride comfort or driving safety.

Fourth, when there is an occupant in an autonomous vehicle, an in-vehicle device may be controlled in a different manner based on a location or condition of the occupant, thereby improving convenience of use and safety.

Effects of the present invention are not limited to the aforementioned effects and other unmentioned effects will be clearly understood by those skilled in the art from the claims.

A vehicle may include an automobile and a motorcycle. In addition, a vehicle may include an internal combustion engine vehicle including an engine as a power source, a hybrid vehicle including both an engine and an electric motor as a power source, and an electric vehicle including an electric motor as a power source.

Figure 1:
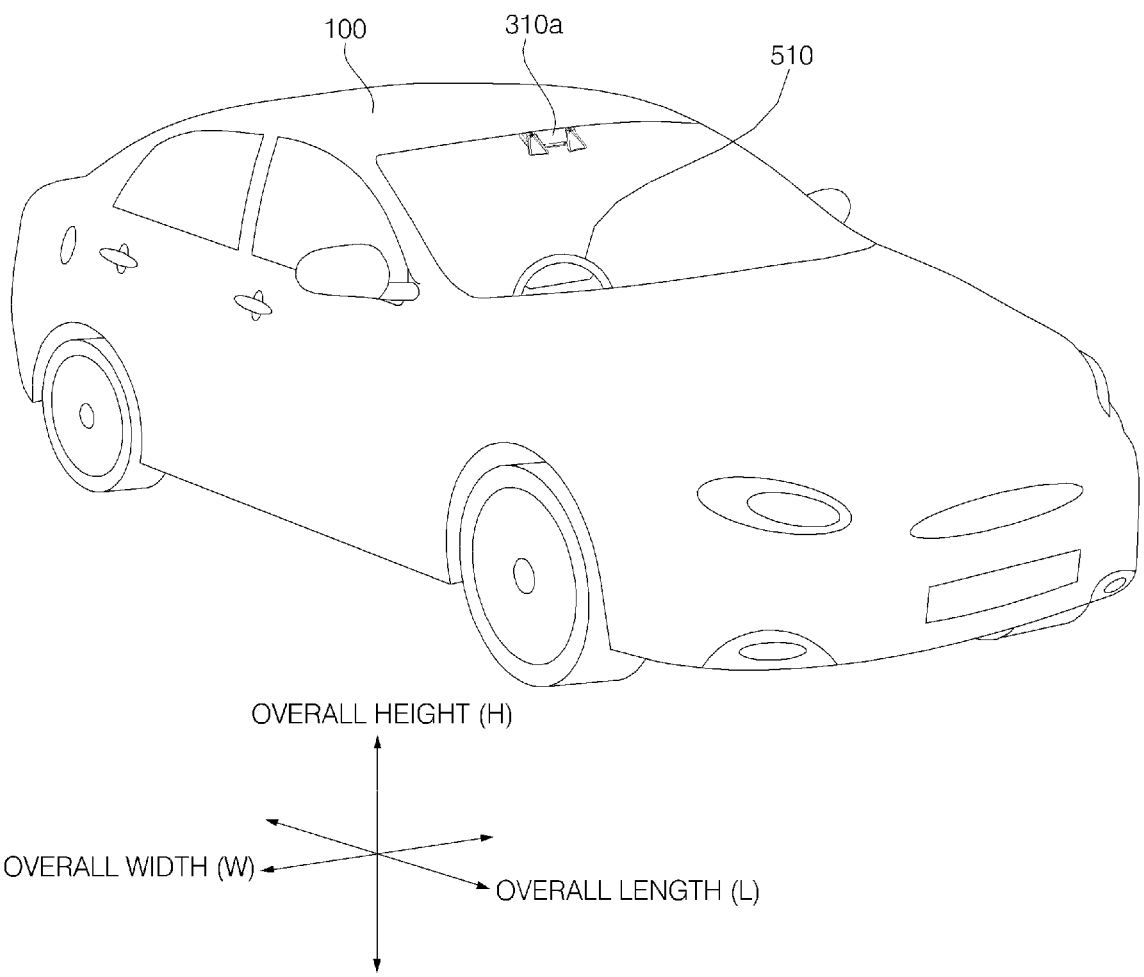
FIG. 1 is a diagram illustrating an example vehicle.
Figure 2:
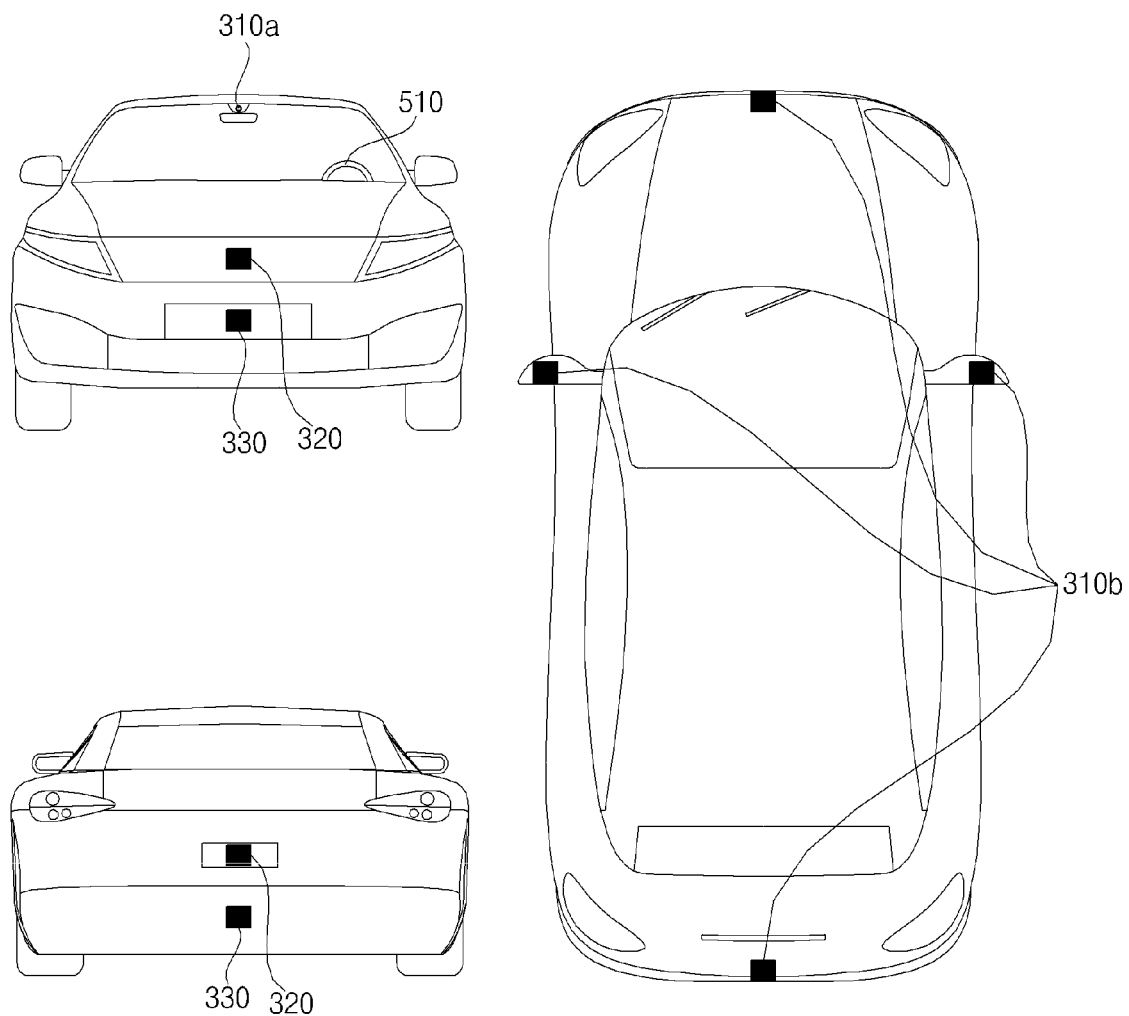
FIG. 2 is a diagram illustrating an example exterior of a vehicle.
Figure 3:
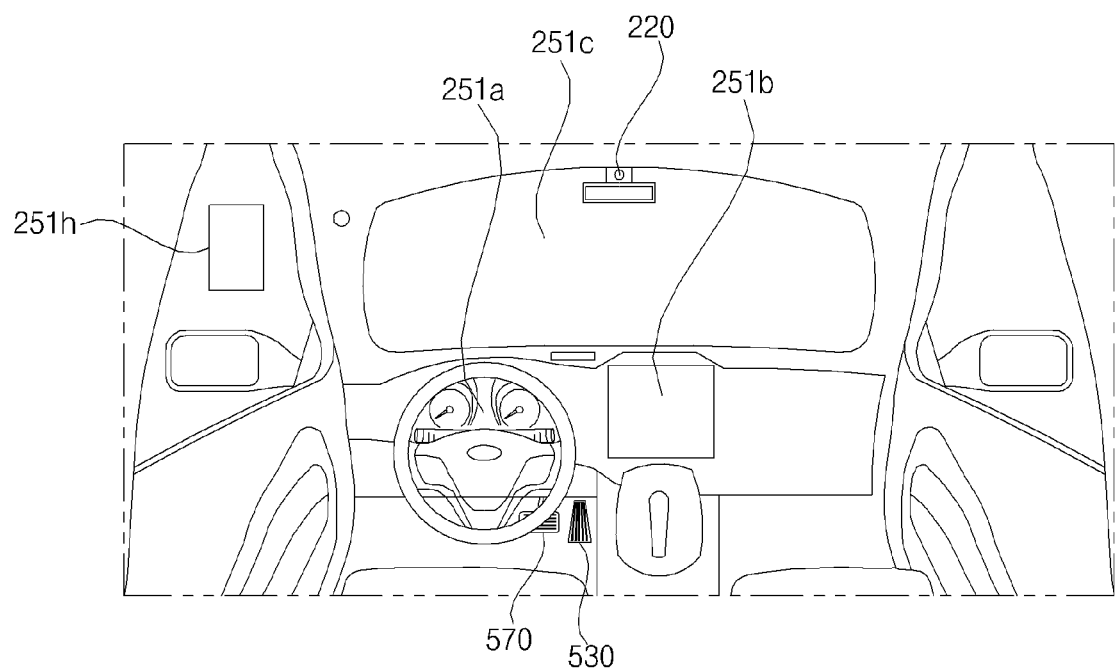
FIGS. 3 and 4 are diagrams illustrating an example interior of a vehicle.
Figure 4:
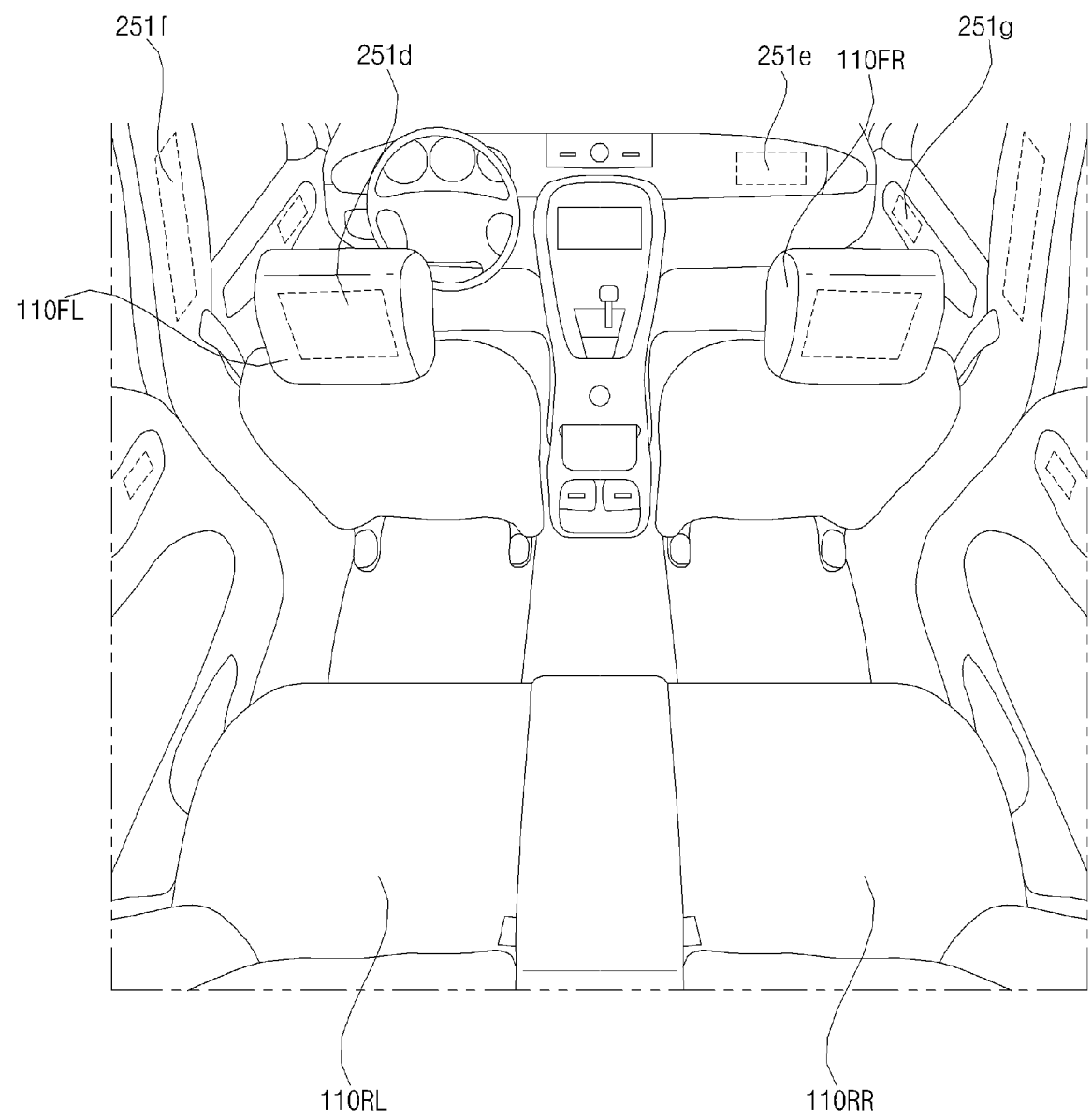
Figure 5:
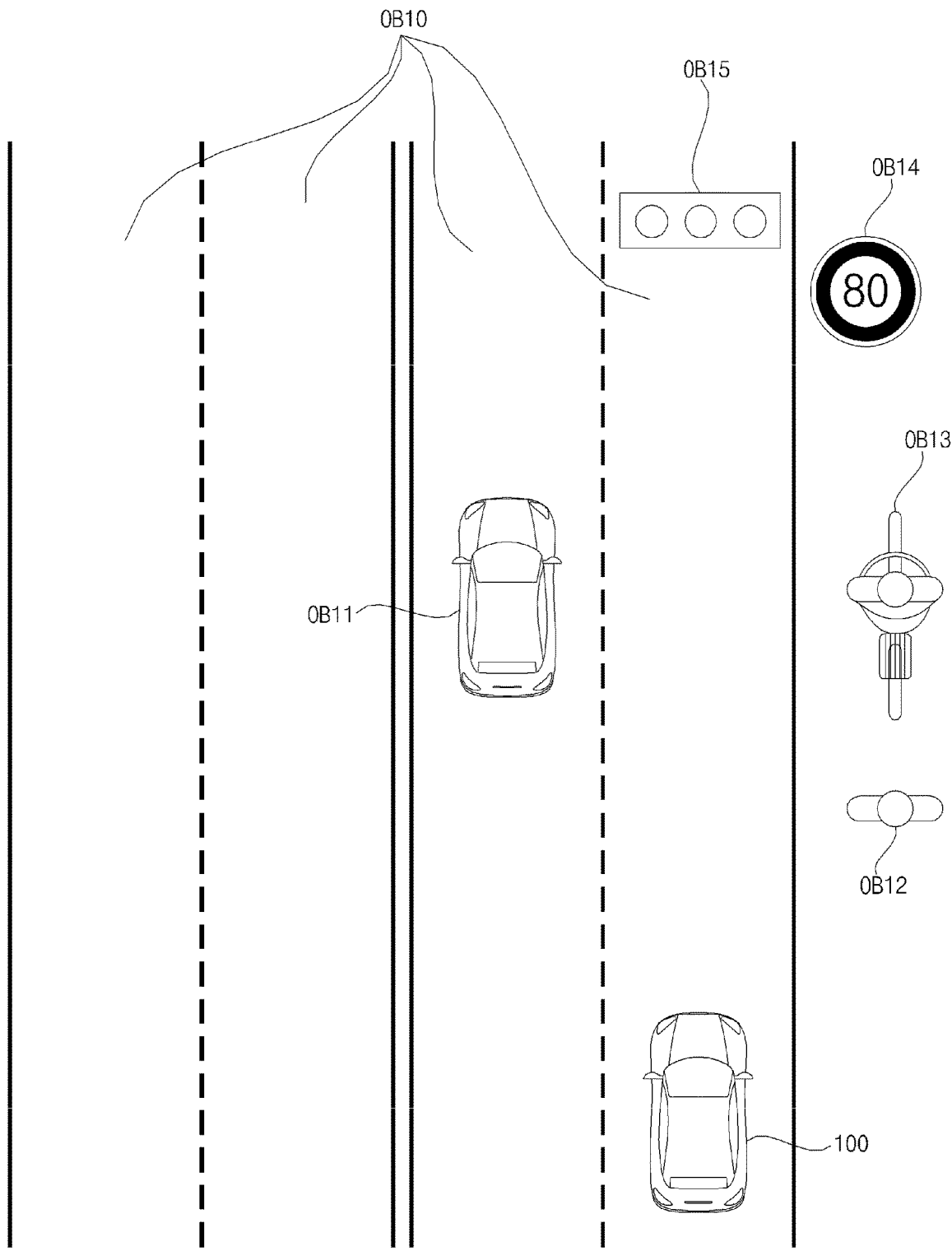
FIGS. 5 and 6 are diagrams illustrating one or more example objects outside a vehicle.
Figure 6:
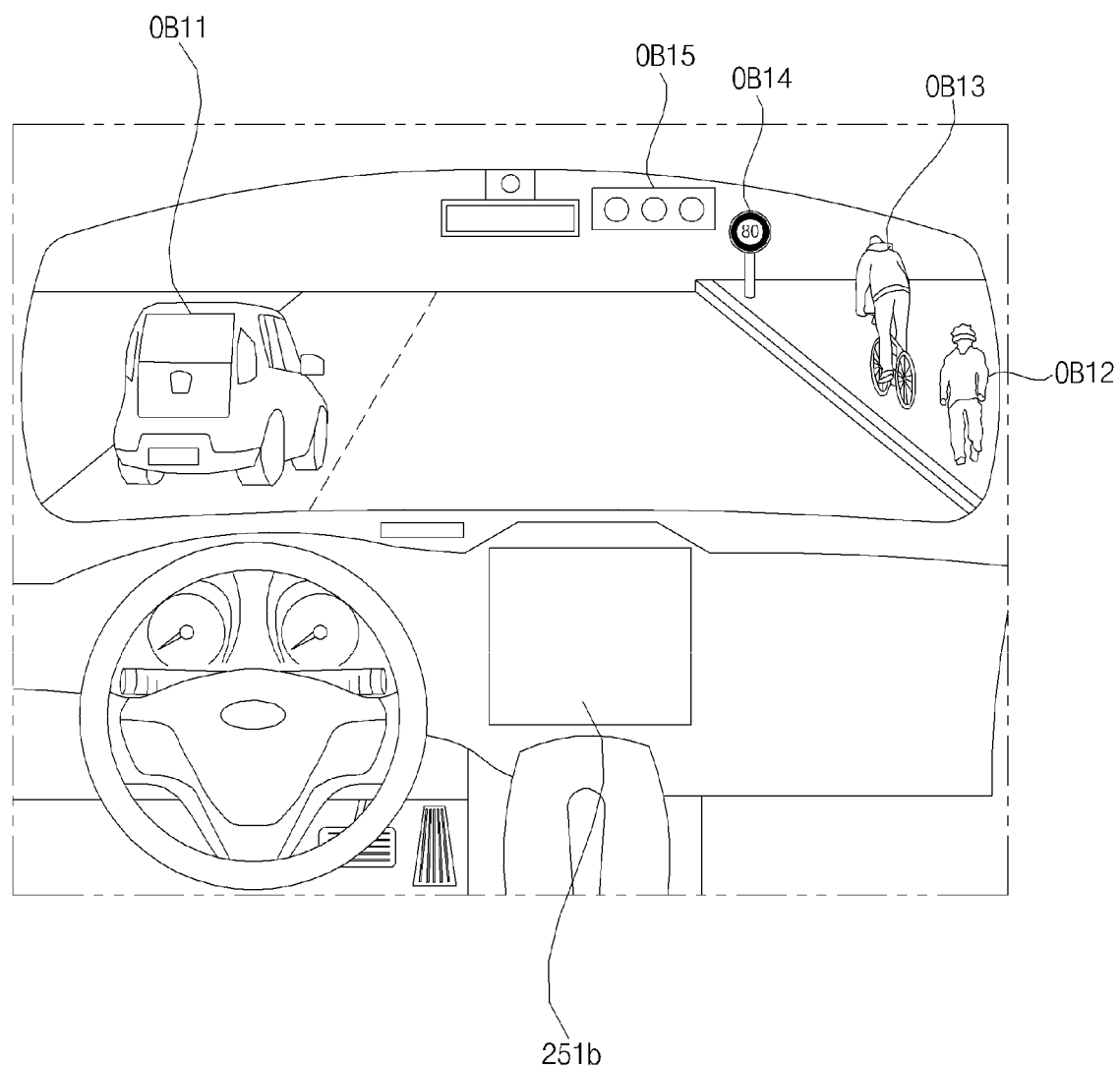
Figure 7:
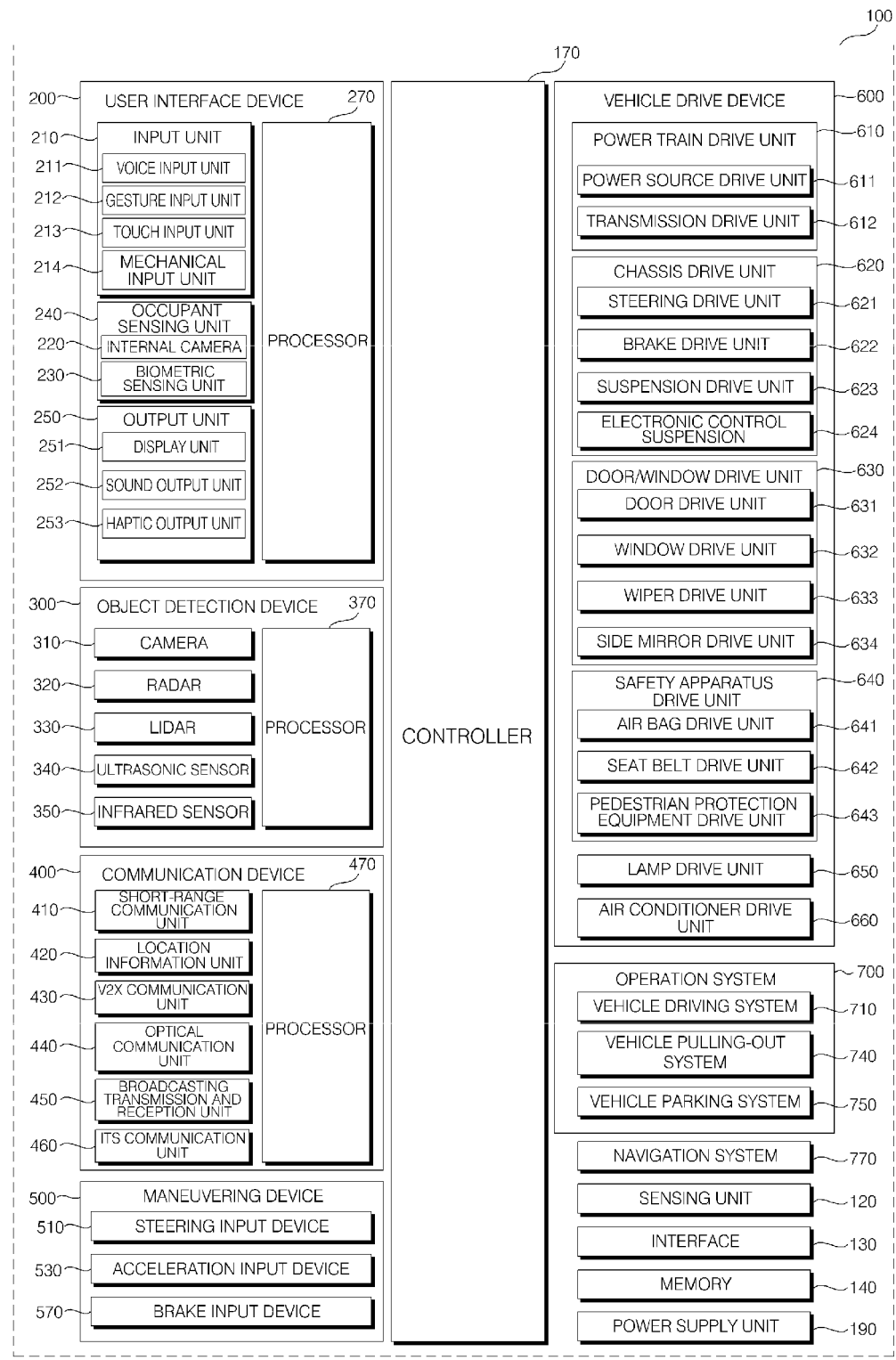
FIG. 7 is a diagram illustrating an example vehicle.

FIG. 1 illustrates an example vehicle. FIG. 2 illustrates an example exterior of a vehicle. FIGS. 3 and 4 illustrate an example interior of a vehicle. FIGS. 5 and 6 illustrate one or more example objects outside a vehicle. FIG. 7 illustrates an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. For example, the autonomous vehicle can be a vehicle that can fully or in part operate without input from a driver.

A control mode of the vehicle 100 may include at least one mode related to controlling the vehicle 100. For example, the control of the vehicle 100 may include an autonomous driving mode, a manual driving mode, and a safe mode.

The autonomous driving mode may be a mode in which control authority of the vehicle 100 is given to at least one processor, for example the controller 170 or the operation system 700. For example, if the vehicle 100 is in the autonomous driving mode, the vehicle 100 may be controlled by the controller 170 or the operation system 700. As a result, the vehicle 100 is able to drive autonomously without control of a driver.

The manual driving mode may be a mode in which a driver has the control authority of the vehicle 100. For example, if the vehicle 100 is in the manual driving mode, the vehicle 100 may drive under control of the driver.

The control mode of the vehicle 100 may be switched to the autonomous driving mode or the manual driving mode based on a user input.

For example, the control mode of the vehicle 100 may be switched from the manual driving mode to the autonomous driving mode, or vice versa, based on a user input received through the user interface apparatus 200.

The control mode of the vehicle 100 may be switched to the autonomous driving mode or the manual driving mode based on various types of information.

For example, the control mode of the vehicle 100 may be switched from the manual driving mode to the autonomous driving mode, or vice versa, based on driving situation information generated by the object detection apparatus 300.

In some implementations, the control mode of the vehicle 100 may be switched from the manual driving mode to the autonomous driving mode, or vice versa, based on driving situation information received through the communication apparatus 400.

In some other implementations, the control mode of the vehicle 100 may be switched from the manual driving mode to the autonomous driving mode, or vice versa, based on information, data, or a signal provided from an external device.

In the autonomous driving mode, the vehicle 100 may be controlled by the operation system 700.

For example, in the autonomous driving mode, the vehicle 100 may operate based on information, data, or a signal generated by the driving system 710, the pulling-out system 740, and the parking system 750.

In the manual driving mode, the vehicle 100 may receive a user input for driving of the vehicle 100 through the driving manipulation apparatus 500. The vehicle 100 may operate based on a user input received through the driving manipulation apparatus 500.

For example, the term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" may refer to the reference direction for the measurement of the overall length of the vehicle 100, the term "overall width direction W" may refer to the reference direction for the measurement of the overall width of the vehicle 100, and the term "overall height direction H" may refer to the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the operation system 700, a navigation system 770, a sensing unit 120, an interface 130, a memory 140, a controller 170, and a power supply unit 190.

In some implementations, the vehicle 100 may further include other components in addition to the components described above, or may not include some of the components described above.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor, such as processor 270.

In some implementations, the user interface apparatus 200 may further include other components in addition to the components described above. In some other implementations, the user interface apparatus 200 may not include some of the components described above.

The input unit 210 is used to receive information from a user, and data collected by the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

An occupant sensing unit 240 may sense an occupant inside the vehicle 100. In some implementations, if an occupant is sensed, then the occupant sensing unit 240 may generate occupant information about the sensed occupant inside the vehicle 100. In some implementations, even if there is no occupant sensed in the vehicle 100, the occupant sensing unit 240 may generate occupant information indicating the absence of any occupant. The occupant sensing unit 240 may include the internal camera 220 and the biometric sensing unit 230. Using the occupant sensing unit 240, the processor 270 or the controller 170 may determine whether there is an occupant inside the vehicle 100, the occupant's location in the vehicle 100, and the occupant's condition in the vehicle 100.

The internal camera 220 may acquire images of the inside of a vehicle. The processor 270 may sense a user's condition based on the images of the inside of the vehicle. For example, the sensed condition of the user may be about a gaze, face, a behavior, facial expression, and a location of the driver.

The processor 270 may acquire information on a gaze direction, face, a behavior, facial expression, and a location of a driver from an image of the inside of the vehicle. The processor 270 may acquire information on a user's gesture from an image of the inside of the vehicle. The processor 270 may provide the information, acquired from the image of the inside of the vehicle, to the controller 170.

The biometric sensing unit 230 may acquire biometric information of the user. The biometric sensing unit 230 may include a sensor for acquire biometric information of the user, and may utilize the sensor to acquire a user's finger print information, heart rate information, brain wave information, etc. The biometric information may be used for user authentication or for determination of a user's condition.

The processor 270 may determine a driver's condition based on the driver's biometric information. The information acquired by the processor 270 through determination of the driver's condition may be a driver condition information. In this case, the driver condition information may indicate a physical condition of the driver, for example whether the driver is in faint, dozing off, out of control, or in an emergency situation. The processor 270 may provide the driver condition information, acquired from the driver's biometric information, to the controller 170.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region 251a of a steering wheel, a region 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In some implementations, the user interface apparatus 200 does not include the processor 270. In these implementations, the user interface apparatus 200 may be controlled by the controller 170 or a processor of a different device inside the vehicle 100.

In some implementations, the user interface apparatus 200 may be referred to as a display device for a vehicle.

The user interface apparatus 200 may be controlled by the controller 170.

The object detection apparatus 300 is used to detect an object outside the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection apparatus 300 may include a camera 310, a radar 320, a lidar 330, an ultrasonic sensor 340, an infrared sensor 350, and a processor 370.

In some implementations, the object detection apparatus 300 may further include other components in addition to the components described above, or may not include some of the components described above.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect and track an object based on acquired images. The processor 370 may calculate the distance to the object and the speed relative to the object, and determine type, location, size, shape, color, route of an object, and contents of a detected text.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

The processor 370 may generate object information based on at least one of the following: an image acquired via the camera 310, a reflection electromagnetic wave received via the radar 320, a reflection laser light received via the lidar 330, a reflection ultrasonic wave received via the ultrasonic sensor 340, and a reflection infrared light received via the infrared sensor 350.

The object information may be information on a type, a location, size, shape, color, a route, and a speed of an object in the vicinity of the vehicle 100, and content of a detected text.

For example, the object information may indicate the following: whether there is a lane in the vicinity of the vehicle 100; whether nearby vehicles are travelling at a time when the vehicle 100 is in a stop; whether there is a space available to park in the vicinity of the vehicle 100; a probability that the vehicle 100 collides with an object; a location of any pedestrian or bicycle in the vicinity of the vehicle 100; a type of the roadway on which the vehicle 100 is travelling; the current traffic signal indicated by a traffic light in the vicinity of the vehicle 100; and movement of the vehicle.

The processor 370 may provide the generated object information to the controller 170.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

The object detection apparatus 300 may be controlled by the controller 170 or a processor inside the vehicle 100.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, and a processor 470.

In some implementations, the communication apparatus 400 may further include other components in addition to the components described above, or may not include some of the components described above.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication apparatus 400.

The processor 470 may acquire information on driving environment of the vehicle 100 based on information received through at least one of the short-range communication unit 410, the location information unit 420, the V2X communication unit 430, the optical communication unit 440, and the broadcast transmission and reception unit 450. The information on driving environment of the vehicle may be vehicle driving information.

For example, the processor 470 may acquire vehicle driving information based information received from a nearby vehicle, such as information on a location, model, a route, speed, and various sensed values of the nearby vehicle. When the information on various sensed values of the nearby vehicle is received, the processor 470 may be able to acquire information on various objects in the vicinity of the vehicle even though the vehicle 100 does not have an additional sensor.

For example, the vehicle driving information may indicate the following: a type, a location, and movement of an object in the vicinity of the vehicle 100; whether there is a lane in the vicinity of the vehicle 100, whether a nearby vehicle is travelling at a time when the vehicle 100 is stopped; whether there is a space available to park in the vicinity of the vehicle 100; a possibility for the vehicle 100 to collide with an object; a location of any pedestrian or bicycle in the vicinity of the vehicle 100; a type of the road on which the vehicle 100 is travelling; a signal of a traffic light in the vicinity of the vehicle 100; and movement of the vehicle 100.

In some implementations, the communication apparatus 400 may include a plurality of processors 470, or may not include the processor 470.

In a case where the communication apparatus 400 does not include the processor 470, the communication apparatus 400 may be controlled by the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may be controlled by the controller 170.

The driving manipulation apparatus 500 is configured to receive a user input for driving the vehicle 100.

In the manual driving mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may be controlled by the controller 170.

The vehicle drive apparatus 600 is configured to electrically control the operation of various devices of the vehicle 100.

The vehicle drive apparatus 600 may include a power train drive unit 610, a chassis drive unit 620, an extra apparatus drive unit 630, a safety apparatus drive unit 640, a lamp drive unit 650, and an air conditioner drive unit 660.

In some implementations, the vehicle drive apparatus 600 may further include other components in addition to the components described above, or may not include some of the components described above.

In some implementations, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

An electronic control suspension 624 reduces vibration of the vehicle 100, thereby improving ride comfort of the vehicle 100. The electronic control suspension 624 may change the height of the vehicle 100 based on conditions of the road on which the vehicle 100 is travelling, and driving conditions of the vehicle 100.

The extra apparatus drive unit 630 may perform electronic control of a door apparatus, a window apparatus inside the vehicle 100, wipers, and side mirrors.

The extra apparatus drive unit 630 may include a door drive unit 631 and a window drive unit 632, a wiper drive unit 633, and a side mirror drive unit 634.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The wiper drive unit 633 may perform electronic control of wipers. The wiper drive unit 633 may control turning on/off the wipers, and speed of the wipers.

The side mirror drive unit 634 may perform electronic control of the side mirrors. The side mirror drive unit 634 may fold or unfold the side mirrors.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may be controlled by the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some implementations, the operation system 700 may further include other components in addition to the components described above, or may not include some of the aforementioned component.

In some implementations, the operation system 700 may include a processor. Each unit of the operation system 700 may include its own processor.

In some implementations, in some implementations, in a case where the operation system 700 is implemented as software, the operation system 700 may be a subordinate component of the controller 170.

In some implementations, in some implementations, the operation system 700 may be a component including at least one selected from among the user interface apparatus 200, the object detection apparatus 300, the communication apparatus 400, the vehicle drive apparatus 600, and the controller 170.

The driving system 710 may perform driving of the vehicle 100.

The driving system 710 may perform driving of the vehicle 100 by providing a control signal to the vehicle drive apparatus 600 in response to reception of navigation information from the navigation system 770.

The driving system 710 may perform driving of the vehicle 100 by providing a control signal to the vehicle drive apparatus 600 in response to reception of object information from the object detection apparatus 300.

The driving system 710 may perform driving of the vehicle 100 by providing a control signal to the vehicle drive apparatus 600 in response to reception of a signal from an external device through the communication apparatus 400.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive apparatus 600 in response to reception of navigation information from the navigation system 770.

The vehicle pulling-out system 740 may perform an operation of pulling the vehicle 100 out of a parking space, by providing a control signal to the vehicle drive apparatus 600 in response to reception of object information from the object detection apparatus 300.

The vehicle pulling-out system 740 may perform an operation of pulling the vehicle 100 out of a parking space, by providing a control signal to the vehicle drive apparatus 600 in response to reception of a signal from an external device.

The vehicle parking system 750 may perform an operation of parking the vehicle 100 in a parking space.

The vehicle parking system 750 may perform an operation of parking the vehicle 100 in a parking space, by providing a control signal to the vehicle drive apparatus 600 in response to reception of navigation information from the navigation system 770.

The vehicle parking system 750 may perform an operation of parking the vehicle 100 in a parking space, by providing a control signal to the vehicle drive apparatus 600 in response to reception of object information from the object detection apparatus 300.

The vehicle parking system 750 may perform an operation of parking the vehicle 100 in a parking space, by providing a control signal to the vehicle drive apparatus 600 in response to reception of a signal from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
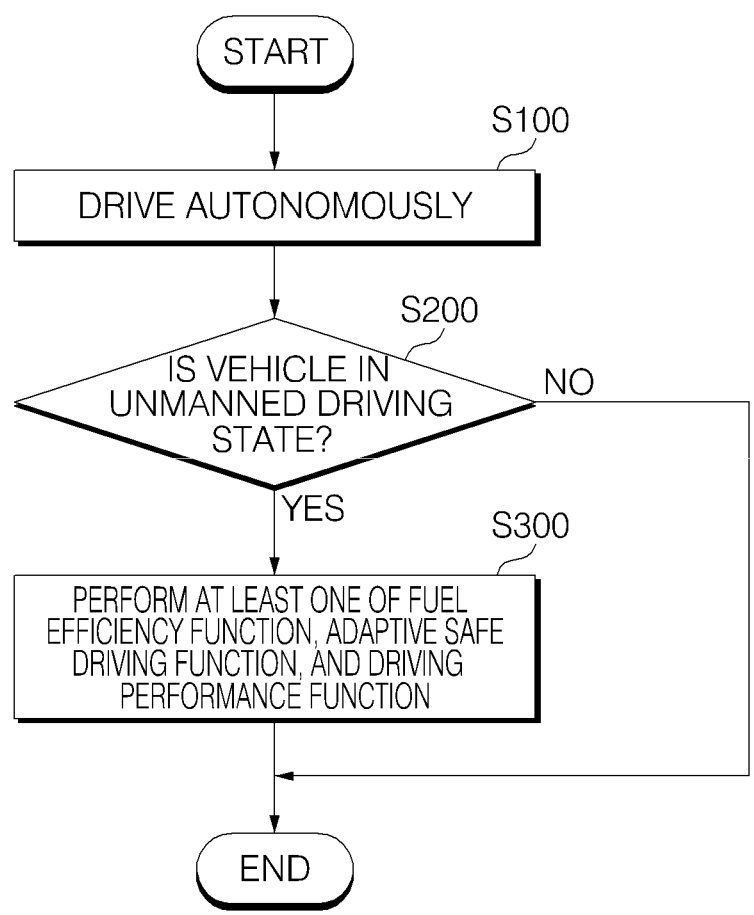
FIG. 8 is a flowchart illustrating an example method of operating an autonomous vehicle.

FIG. 8 illustrate an example method of operating an autonomous vehicle.

The controller 170 or the driving system 710 may control the vehicle 100 to drive autonomously S100.

The controller 170 may determine whether the vehicle is in an unmanned driving state in S200.

The unmanned driving state is a state in which the vehicle 100 is autonomously driving without an on-board occupant. The controller 170 may determine, via the occupant sensing unit 240, whether there is an occupant in the vehicle 100. The controller 170 may determine whether the vehicle 100 is in the unmanned driving state which indicates autonomous driving without any occupant.

When the vehicle 100 is autonomously driving, the controller 170 may control at least one device provided in the vehicle 100 to be operated based on presence or absence of an occupant.

If it is determined that the vehicle 100 is in an unmanned driving state which indicates autonomous driving without an on-board occupant, the controller 170 may control at least one device provided in the vehicle 100 to be operated at the unmanned driving state.

If the vehicle 100 is in the unmanned driving state, the controller 170 may perform at least one function among a fuel efficiency task, a safe driving task, and a driving performance task in S300.

If the vehicle 100 is in the unmanned driving state, the controller 170 controls at least one device of the vehicle 100 to perform the fuel efficiency task, the safe driving task, and the driving performance task.

The fuel efficiency task is a function of improving fuel efficiency of a vehicle without having a human inside the vehicle more than that of a vehicle having a human inside the vehicle. For example, the fuel efficiency task is a function of reducing energy consumption of the vehicle 100 by inactivating an unnecessary device.

The safe driving task is a function of controlling a vehicle 100 without an on-board occupant in a different manner, compared to a vehicle 100 with an on-board occupant, in a situation which is related to the safety of the vehicle 100. For example, the safe driving task is a function of operating the vehicle 100 by putting pedestrians above a vehicle without having a human inside the vehicle.

The driving performance task is a function of controlling the vehicle 100 to improve driving performance when there is no occupant in the vehicle 100, even though it may result in degradation of ride comfort for the vehicle 100. For example, the driving performance task is a function of improving driving safety of the vehicle 100 by increasing suspension stiffness of the vehicle 100 when there is no occupant in the vehicle 100.

Hereinafter, the fuel efficiency task, the safe driving task, and the driving performance task are described in detail.

FIGS. 9A to 9F illustrate an example autonomous vehicle that performs a fuel efficiency task or a safe driving task.

If the vehicle 100 is in an unmanned driving state, the controller 170 may inactivate at least one in-vehicle device which is operated based upon presence of an occupant. By inactivating the device which is operated based upon the presence of an occupant, the controller 170 may perform the fuel efficiency task or the safe driving task.

The device which is operated based upon the presence of an occupant may be a device provided for the sake of an occupant's convenience or safety. The device which is operated based upon the presence of an occupant may be a device which does not need to be activated in the absence of an occupant. The device which is operated based upon the presence of an occupant may include at least one of the user interface 200, the driving manipulation apparatus 500, the safety apparatus drive unit 640, the lamp drive unit 650, the air-conditioner drive unit 660, the wiper drive unit 633, the side mirror drive unit 634, and the electronic control suspension 624.

For example, the input unit 210 and the output unit 250 of the user interface apparatus 200 are used to receive an input from an occupant and to inform the occupant of specific information. Thus, when there is no occupant, the input unit 210 and the output unit 250 may be unnecessary.

The controller 170 may perform the fuel efficiency task by inactivating at least one of the following: the user interface apparatus 200, the driving manipulation apparatus 500, the lamp drive unit 650, the air-conditioner drive unit 660, the wiper drive unit 633, the side mirror drive unit 634, and the electronic control suspension 624.

The controller 170 may reduce energy consumption of the vehicle 100 by inactivating an unnecessarily activated apparatus when there is no occupant in the vehicle 100. In this case, the fuel efficiency task is a function of reducing energy consumption of the vehicle 100.

The controller 170 may perform the safe driving task by inactivating the safety apparatus drive unit 640.

For example, when there is no occupant in the vehicle 100, it is not necessary to drive an airbag apparatus or a seat belt apparatus. Thus, if the vehicle 100 is in the unmanned driving state, the controller 170 may inactivate the airbag drive unit 641 or the seat belt drive unit 642. In this case, even if the vehicle 100 collides with an object, the airbag apparatus or the seatbelt apparatus does not operate.

Figure 9A:
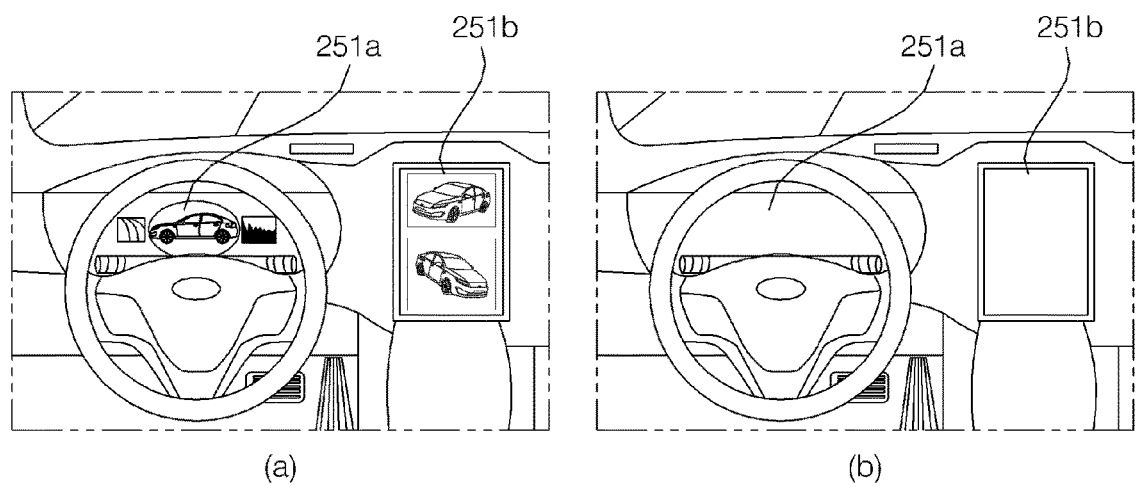
FIGS. 9A to 9F are diagrams illustrating an example autonomous vehicle that performs a fuel efficiency task or a safe driving task.

Referring to FIG. 9A, when the vehicle 100 is in the unmanned driving state, the controller 170 may perform the fuel efficiency task by inactivating the user interface apparatus 200.

The vehicle 100 may include the user interface apparatus 200. The user interface apparatus 200 may include the input unit 210 for receiving a user input, the occupant sensing unit 240 for sensing an occupant, and the output unit 250 for outputting various kinds of warning to a user.

The first example of FIG. 9A illustrates a case where there is an occupant in the vehicle 100. When there is an occupant in the vehicle 100, the controller 170 may activate a cluster 251a of the display unit 251, and a touch screen 251b which is a layered combination of the display unit 251 and the touch input unit 213. In this case, various kinds of information related to driving of the vehicle 100 may be displayed on the cluster 251a. Various buttons for controlling the vehicle 100, and a condition of the vehicle 100 may be displayed on the touch screen 251b.

The second example of FIG. 9A illustrates a case where there is no occupant in the vehicle 100. When the vehicle 100 is in an unmanned driving state, there is no occupant in the vehicle 100, and thus, it is not necessary receive a user input, sense a condition of an occupant, or output a warning. The vehicle 100 is in the unmanned driving state, the controller 170 may inactivate the user interface apparatus 200. By inactivating the user interface apparatus 200, the controller 170 may perform the fuel efficiency task. In this case, the fuel efficiency task is a function of reducing an amount of energy consumed by the user interface apparatus 200.

Figure 9B:
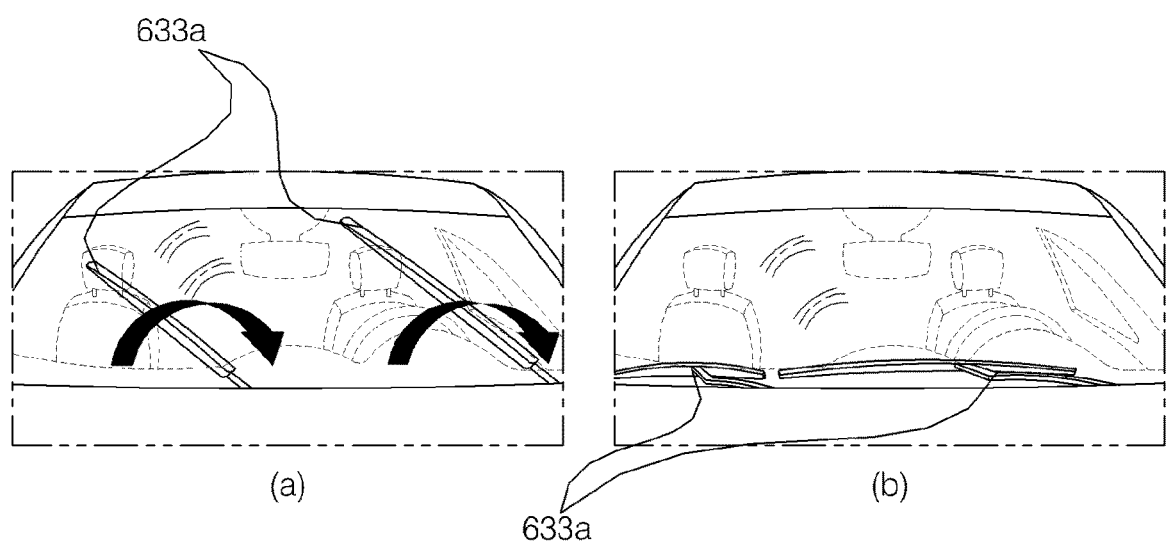

Referring to FIG. 9B, when the vehicle 100 is in the unmanned driving state, the controller 170 may perform the fuel efficiency task by inactivating the wiper drive unit 633.

The vehicle 100 may include a wiper apparatus 633a and the wiper drive unit 633. The wiper drive unit 633 may perform electronic control of the wiper apparatus 633a. The controller 170 may control the wiper drive unit 633 based on weather conditions.

The first example of FIG. 9B illustrates a case where there is an occupant in the vehicle 100. When there is an occupant in the vehicle 100, the controller 170 may sense the presence of rain, and drive the wiper drive unit 633. In addition, the controller 170 may control speeds of the wiper drive unit 633a based on precipitation.

The first example of FIG. 9B illustrates a case where there is no occupant in the vehicle 100. When the vehicle 100 is in an unmanned driving state, there is no occupant in the vehicle 100, and thus, it is not necessary to operate the wiper drive unit 633. Accordingly, when the vehicle 100 is in the unmanned driving state, the controller 170 may inactivate the wiper drive unit 633. In this case, the wiper apparatus 633a may not operate even when it rains. By inactivating the wiper drive unit 633, the controller 170 may perform the fuel efficiency task. In this case, the fuel efficiency task is a function of reducing an amount of energy consumed by the wiper drive unit 633.

Figure 9C:
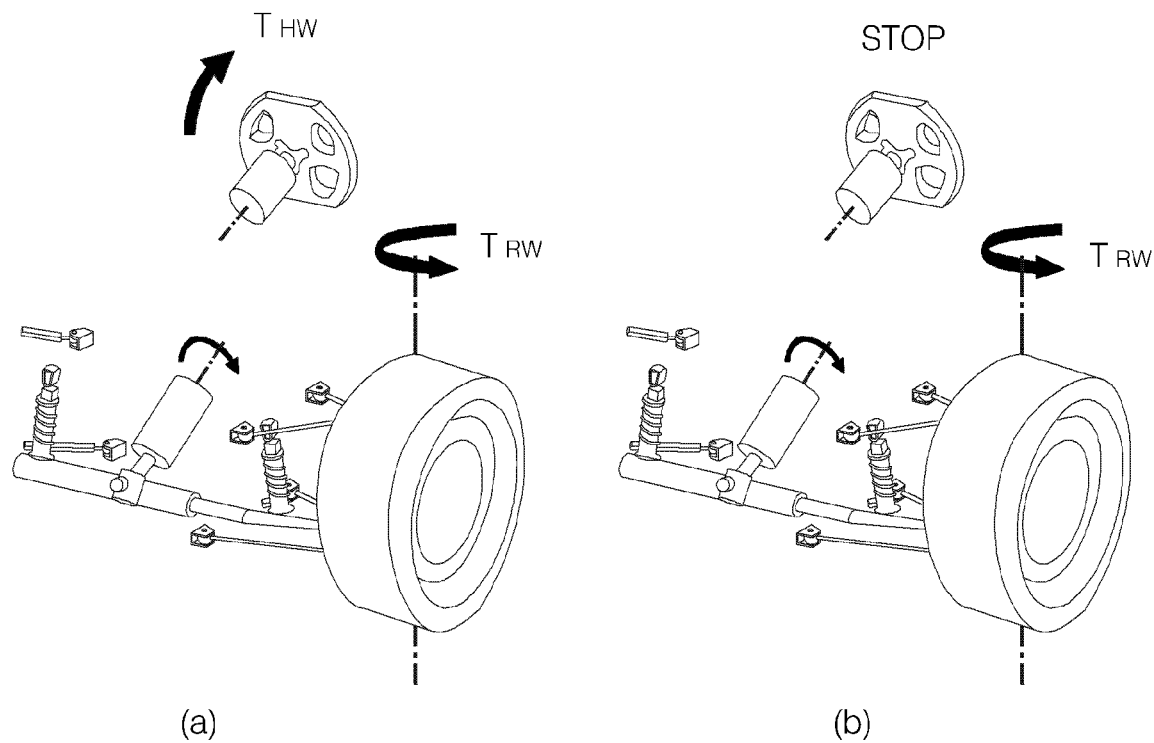

Referring to FIG. 9C, when the vehicle 100 is the unmanned driving state, the controller 170 may perform the fuel efficiency task by inactivating the driving manipulation apparatus 500. In this case, the driving manipulation apparatus 500 may be an electronic control apparatus. The electronic control apparatus may be connected electrically, not mechanically, to the vehicle drive apparatus 600 of the vehicle 100.

The driving manipulation apparatus 500 may include an electronic steering apparatus. The electronic steering apparatus may refer to a Steer By Wire (SWB) system. The electronic steering apparatus is a device that generates an electronic signal corresponding to an angle of a steering wheel to apply a steering input of the vehicle 100.

The first example of FIG. 9C illustrates a case where there is an occupant in the vehicle 100. When there is an occupant in the vehicle 100, the controller 170 may activate the driving manipulation apparatus 500. When there is an occupant in the vehicle 100, the occupant is able to intervene in controlling the vehicle 100 via the driving manipulation apparatus 500 even though the vehicle 100 is autonomously driving. For example, if an occupant inputs a brake signal using a brake apparatus when the vehicle 100 is autonomously driving, the vehicle 100 may come to a stop.

In addition, when there is an occupant in the vehicle 100, the controller 170 may activate the electronic steering apparatus. In this case, steering of the vehicle 100 and steering of the steering wheel are electrically connected, so that the steering wheel may move in response to movement of the steering of the vehicle 100.

The second example of FIG. 9C illustrates a case where there is no occupant in the vehicle 100. When the vehicle 100 is in the unmanned driving state, there is no occupant in the vehicle 100, and thus, it is not necessary to operate the driving manipulation apparatus 500 or the electronic steering apparatus. Accordingly, when the vehicle 100 is in the unmanned driving state, the controller 170 may inactivate the driving manipulation apparatus 500 or the electronic steering apparatus. By inactivating the driving manipulation apparatus 500 or the electronic steering apparatus, the controller 170 may perform the fuel efficiency task. In this case, despite movement of the steering of the vehicle 100, the steering wheel may not move. In this case, the fuel efficiency task is a function of reducing an amount of energy consumed by the driving manipulation apparatus 500 or the electronic steering apparatus.

Figure 9D:
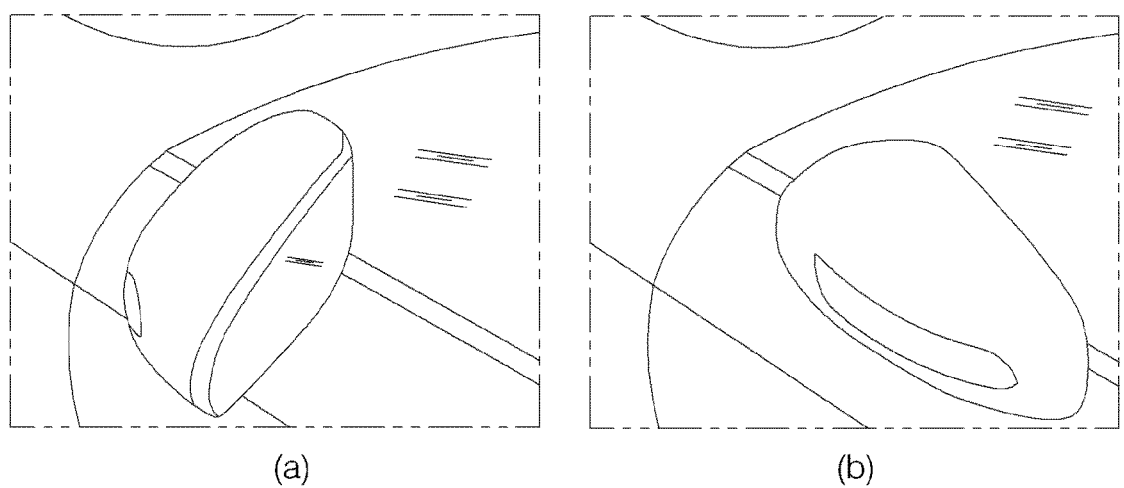

Referring to FIG. 9D, when the vehicle 100 is in the unmanned driving state, the controller 170 may perform the fuel efficiency task by inactivating the side mirror drive unit 634.

The side mirror drive unit 634 may perform electronic control of side mirrors provided in the vehicle 100.

The first example of FIG. 9D illustrates a case where there is an occupant in the vehicle 100. When there is an occupant in the vehicle 100, the controller 170 may activate the side mirror drive unit 634. If the vehicle 100 starts on when the side mirror drive unit 634 is activated, the side mirrors of the vehicle 100 may be unfolded. In addition, if the vehicle 100 is turned off, the side mirrors of the vehicle 100 may be folded.

The second example of FIG. 9D illustrates a case where there is no occupant in the vehicle 100. When the vehicle 100 is in the unmanned driving state, there is no occupant in the vehicle 100, and thus, it is not necessary to operate the side mirror drive unit 634. Accordingly, when the vehicle 100 is in the unmanned driving state, the controller 170 may inactivate the side mirror drive unit 634. In this case, the side mirrors may remain folded, regardless of whether the vehicle 100 starts on or is turned off. By inactivating the side mirror drive unit 634, the controller 170 may perform the fuel efficiency task. In this case, the fuel efficiency task is a function of reducing an amount of energy consumed by the side mirror drive unit 634.

Figure 9E:
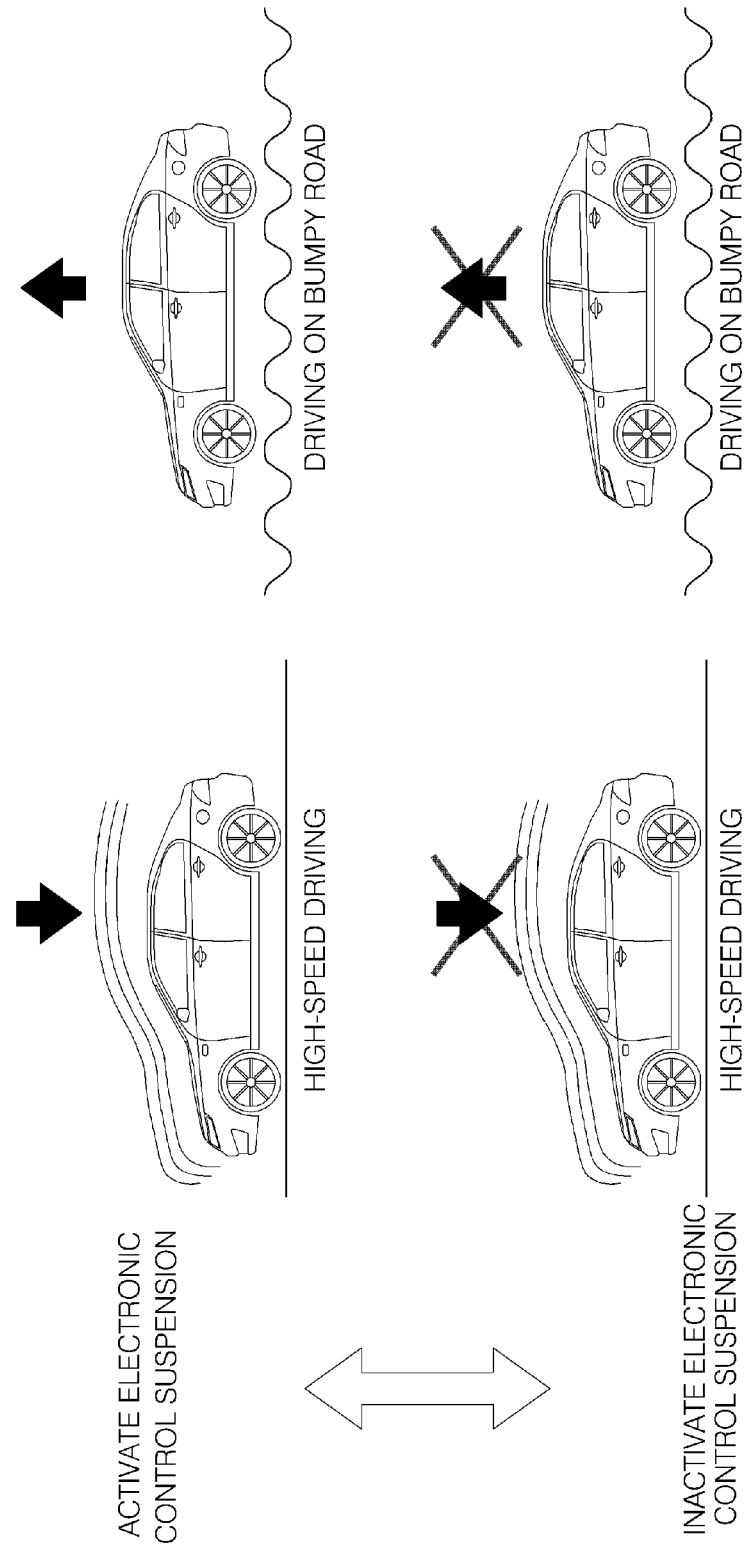

Referring to FIG. 9E, when the vehicle 100 is in the unmanned driving state, the controller 170 may perform the fuel efficiency task by inactivating the electronic control suspension 624.

When there is an occupant in the vehicle 100, the controller 170 may activate the electronic control suspension 624. When the electronic control suspension 624 is inactivated, the controller 170 may lower the height of the vehicle 100 if the vehicle 100 drives at high speeds. The controller 170 may raise the height of the vehicle 100 if the vehicle 100 is driving on a bumpy road. Accordingly, the vehicle 100 may provide the occupant with better ride comfort.

When the vehicle 100 is in the unmanned driving state, there is no occupant in the vehicle 100, and thus, it is not necessary to improve ride comfort of the vehicle 100. Accordingly, it is not necessary to operate the electronic control suspension 624.

When the vehicle 100 is in the unmanned driving state, the controller 170 may inactivate the electronic control suspension 624. In this case, the height of the vehicle 100 may be maintained even when a driving condition of the vehicle 100 is changed. By inactivating the electronic control suspension 624, the controller 170 may perform the fuel efficiency task. In this case, the fuel efficiency task is a function of reducing an amount of energy consumed by the electronic control suspension 624.

Figure 9F:
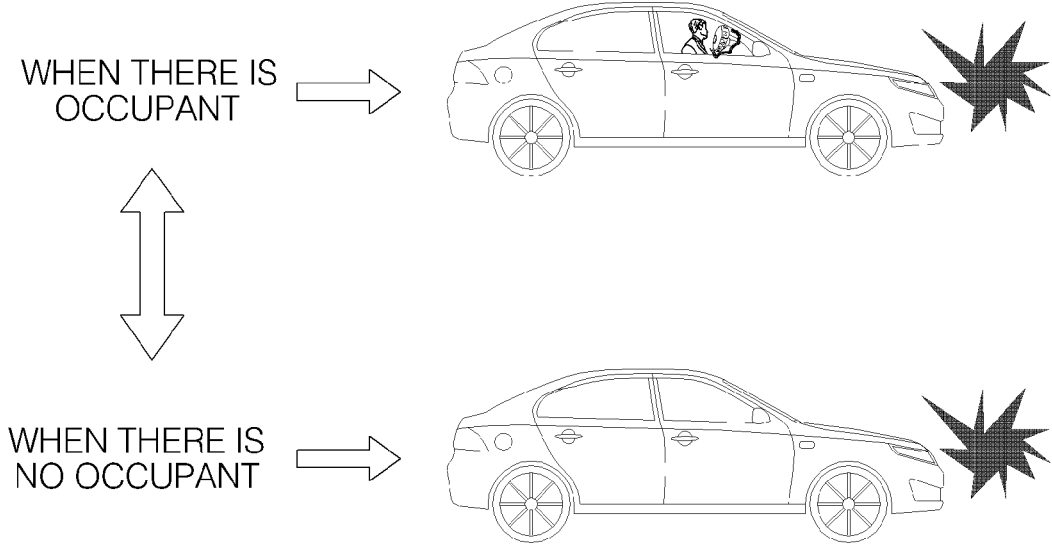

Referring to FIG. 9F, when the vehicle 100 is in the unmanned driving state, the controller 170 may perform the safe driving task by inactivating the safety apparatus drive unit 640.

If the vehicle 100 collides with a specific object when there is an occupant in the vehicle 100, the controller 170 may activate the safety apparatus drive unit 640. If the safety apparatus drive unit 640 is activated, an airbag apparatus and a seatbelt apparatus of the vehicle 100 may operate.

If the vehicle 100 collides with a specific object when there is no occupant in the vehicle 100, the controller 170 may inactivate the safety apparatus drive unit 640. When the vehicle 100 is in the unmanned driving state, there is no occupant in the vehicle 100, and thus, it is not necessary to operate the airbag apparatus or the seatbelt apparatus. Accordingly, when the vehicle 100 is in the unmanned driving state, the controller 170 may inactivate the safety apparatus drive unit 640. In this case, the airbag apparatus or the seatbelt apparatus does not operate even when the vehicle 100 collides with a specific object. By inactivating the safety apparatus drive unit 640, the safety apparatus drive unit 640 may perform the safe driving task. In this case, the safe driving task is a function of preventing the safety apparatus drive unit 640 from operating when it is not necessary to operate a safety apparatus.

When the vehicle 100 is in the unmanned driving state, the controller 170 may inactivate the air-conditioner drive unit 660. When there is no occupant in the vehicle 100, it is not necessary to operate the air-conditioner drive unit 660. Accordingly, the controller 170 may perform the fuel efficiency task by inactivating the air-conditioner drive unit 660. In this case, the fuel efficiency task is a function of reducing an amount of energy consumed by the air-conditioner drive unit 660.

FIG. 10 illustrates an example autonomous vehicle that performs a fuel efficiency task by controlling a lamp drive unit or a lamp of the vehicle.

When the vehicle 100 is in the unmanned driving state, the controller 170 may inactivate the lamp drive unit 650. In this case, the vehicle 100 may include a sensor that is able to sense an object in the dark. Such a sensor may be a lidar sensor. When there is no occupant and the lidar sensor is provided in the vehicle 100, it is not necessary to operate the lamp drive unit 650. Accordingly, the controller 170 may perform the fuel efficiency task by inactivating the lamp drive unit 650. In this case, the fuel efficiency task is a function of reducing an amount of energy consumed by the lamp drive unit 650.

If a sensor provided in the vehicle needs a specific light, the controller 170 may not inactivate the lamp drive unit 650. Accordingly, when the vehicle 100 is in the unmanned driving state, the controller 170 may control light intensity or an irradiation range of at least one lamp of the vehicle 100 based on a sensing range of at least one sensor provided in the vehicle 100.

Referring to the first example of FIG. 10, when there is an occupant in the vehicle 100, the controller 170 may control light intensity or an irradiation range of a lamp, so that the occupant may be able to observe the surroundings of the vehicle 100. Accordingly, the light intensity or irradiation range of the lamp may increase relatively.

Referring to the second example of FIG. 10, when there is no occupant in the vehicle 100, the controller 170 may control light intensity or an irradiation range of a lamp, so that an object in the vicinity of the vehicle 100 may be sensed by a sensor. Accordingly, the light intensity or irradiation range of the lamp may decrease relatively.

Figure 11:
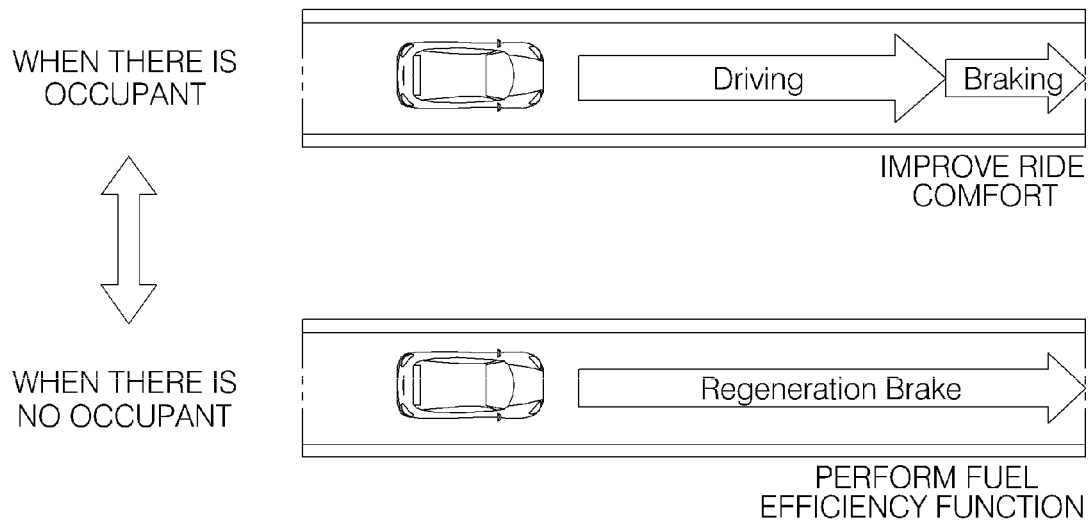
FIG. 11 is a diagram illustrating an example autonomous vehicle that performs a fuel efficiency task using a regenerative brake system.

FIG. 11 illustrates an example autonomous vehicle that performs a fuel efficiency task using a regenerative brake system.

When the vehicle 100 is in the unmanned driving state, the controller 170 may increasingly utilize a regenerative brake system in an operation of braking the vehicle 100, as compared to scenarios in which the vehicle 100 is occupied.

In some examples, the vehicle 100 may implement a regenerative brake system that performs a braking operation for the vehicle 100 by using a reverse rotation force of an electronic motor as a braking force to decelerate the vehicle 100. In this case, the regenerative brake system may convert kinetic energy of the moving vehicle 100 into electric energy that is stored and used accordingly, thus actively slowing down the vehicle and converting the resulting loss of kinetic energy into usable electric energy. The controller 170 or the driving system 710 may implement the regenerative system by controlling the power train drive unit 610 and the chassis drive unit 620.

Therefore, the controller 170 or the driving system 710 may brake the vehicle 100 by controlling one or both of the brake drive unit 622 and the regenerative braking system.

The overall frequency or rate at which regenerative braking is activated may be referred to as the intervention rate of the regenerative braking system. The intervention rate may be controlled, for example, by one or more criteria detected by the regenerative braking system.

If the intervention rate of the regenerative braking system in an operation of braking the vehicle 100 increases, the vehicle 100 may require a greater battery charge amount.

If the intervention rate of the regenerative braking system in an operation of braking the vehicle 100 increases, an occupant inside the vehicle 100 may feel a sense of incompatibility. Accordingly, in scenarios where an occupant is inside the vehicle 100, if the intervention rate of the regenerative braking system in an operation of braking the vehicle 100 increases, it may degrade the ride comfort for the occupant.

In addition, when there is an occupant in the vehicle 100, the controller 170 or the driving system 710 may use the brake driving unit 622 to brake the vehicle 100. In this case, the ride comfort for the occupant may improve.

By contrast, when there is no occupant in the vehicle 100, concerns of occupant comfort may be less important, and the controller 170 or the driving system 710 may instead increase the intervention rate of the regenerative braking system in an operation of braking the vehicle 100. For example, the controller 170 or the driving system 710 may perform the fuel efficiency task by increasing the intervention rate of the regenerative braking system in an operation of braking the vehicle 100. In this case, the fuel efficiency task is a function of increasing a charged amount of energy using the regenerative braking system.

Figure 12:
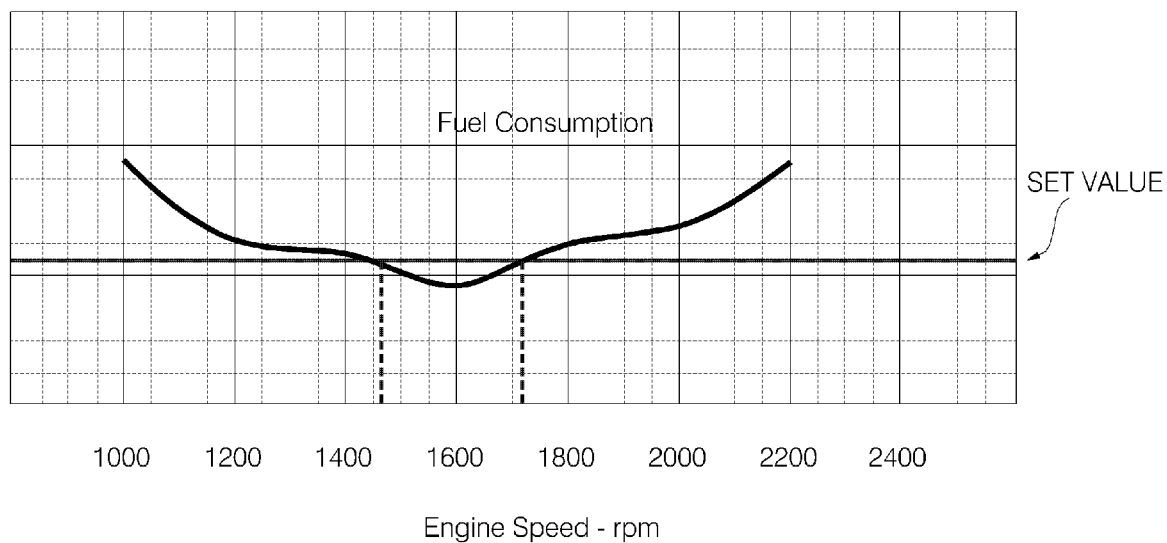
FIG. 12 is a graph illustrating an example relationship between fuel consumption and engine speed of an autonomous vehicle.

FIG. 12 illustrates an example relationship between fuel consumption and engine speed of an autonomous vehicle.

When the vehicle 100 is in the unmanned driving state, the controller 170 may control the Adaptive Cruise Control (ACC) speed of the vehicle 100 based on engine RPM values corresponding to an amount of fuel consumption of the vehicle 100 that satisfies a set value (e.g., is at or below the set value).

In FIG. 12, the horizontal axis represents engine RPM values, and the vertical axis shows corresponding amounts of fuel consumption. In this case, there may be engine RPM values at which a corresponding amount of fuel consumption is at or below a set value. The set value may be, for example, a value that is determined through experiments or through predictive models.

The controller 170 may calculate the engine RPM values that correspond to the amount of fuel consumption of the vehicle 100 being at or below the set value. When the vehicle 100 is autonomously driving, the controller 170 may control the vehicle 100 based on a preset ACC speed. When there is an occupant in the vehicle 100, the occupant may adjust the ACC speed.

However, when there is no occupant in the vehicle 100, the controller 170 may control the ACC speed to better improve fuel efficiency. In this case, if the ACC speed of the vehicle 100 is adjusted based on engine RPM values that correspond to an amount of fuel consumption being at or below a set value, and thus fuel efficiency of the vehicle 100 may improve.

When the vehicle 100 is in the unmanned driving state, the controller 170 may perform the fuel efficiency task by controlling the ACC speed of the vehicle 100 based on the engine RPM values at which an amount of fuel consumption of the vehicle 100 is at or below the set value. In this case, the fuel efficiency task is a function of reducing an amount of fuel consumption of the vehicle 100 based on the engine PRM values at which the amount of fuel consumption of the vehicle 100 is at or below the present value.

FIGS. 13A to 13D illustrate an example autonomous vehicle that performs a safe driving task.

The controller 170 may determine whether the vehicle 100 is in the unmanned driving state. When the vehicle 100 is driving in the unmanned driving state, the controller 170 may determine a likelihood that the vehicle 100 will collide with a first object. The controller 170 may also determine whether the vehicle 100 is able to avoid a possible collision with the first object. For example, the controller 170 may determine such likelihoods based on a travelling direction of the vehicle, speed of the vehicle, road conditions, or other factors.

The controller 170 may additionally determine whether the vehicle 100 is likely to collide with a second object if the vehicle 100 manages to avoid a collision with the first object. For example, the controller 170 may determine such likelihoods based on collision-avoidance mechanisms implemented in the vehicle 100 and/or based on relative locations of the first and second objects.

Figure 13A:
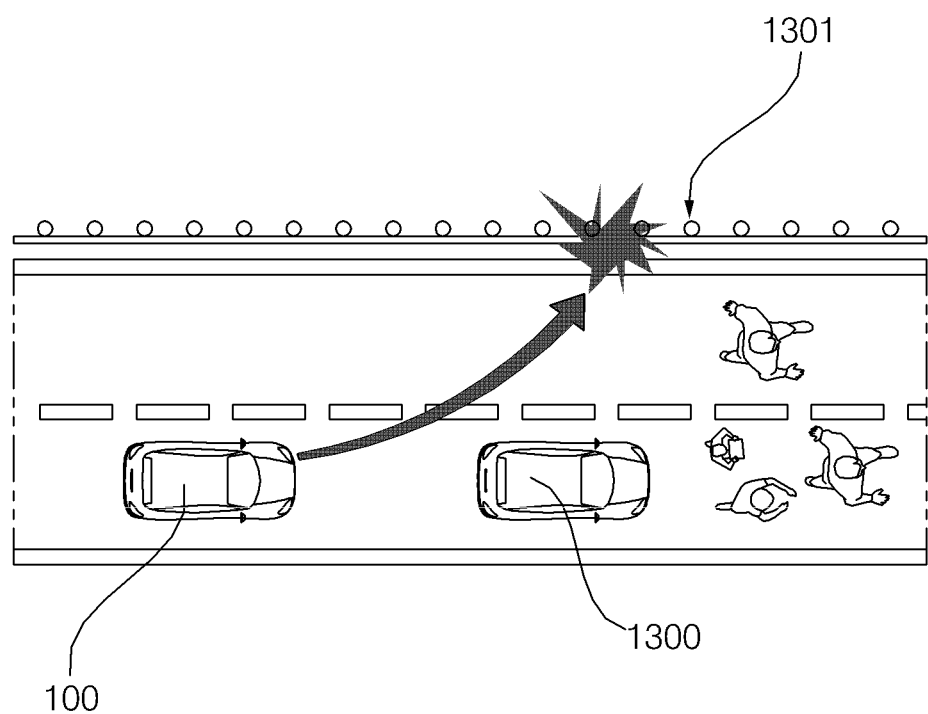
FIGS. 13A to 13D are diagrams illustrating an example autonomous vehicle that performs a safe driving task.

As an example, referring to FIG. 13A, in a case where a first object is a nearby vehicle 1300 and a second object is a guardrail 1301, the controller 170 may determine that the vehicle 100 is likely to collide with the guardrail 1301 if the vehicle 100 avoids a collision with the nearby vehicle 1300. In addition, the controller 170 may determine that the vehicle 100 is likely to hit people in front of the nearby vehicle 1300 if the vehicle 100 avoids a collision with the nearby vehicle 1300 and avoids a collision with the guardrail 1301.

In such scenarios, when it is determined that the vehicle 100 will collide with the second object if the vehicle 100 avoids collision with the first object, the controller 170 may determine levels of importance of the first object and the second object.

For example, the controller 170 may rank a human, a manned nearby vehicle, and a structure in order of importance such that the human is the most important and the structure is the least important. For example, the controller 170 can determine respective scores for a human, a vehicle having a human, and a structure. The controller 170 may determine that the structure and a nearby vehicle without a passenger on board has the same level of importance.

The controller 170 may determine a type of a detected object based on object information acquired via the object detection apparatus 300. For example, the controller 170 may determine whether the detected object is a guardrail, a pedestrian, or a vehicle. The controller 170 may acquire information transmitted by a nearby vehicle and determine whether a human is on board the nearby vehicle.

The controller 170 may determine a level of importance of a detected object based on a type of the detected object. For example, the controller 170 may determine that a human has a greater level of importance than that of an inanimate object. For example, the controller 170 may determine that a pedestrian has a greater level of importance than that of a nearby vehicle.

Referring to FIG. 13A, a first object is a nearby vehicle 1300 and a second object is the guardrail 1301. In this case, for example, if two or more people in front of the vehicle 1300 are detected, the controller 170 may determine that people have the highest level of importance. In another example, if it is determined, based on information transmitted by the nearby vehicle 1300, that there is a person inside the nearby vehicle 1300, the controller 170 may determine that the nearby vehicle 1300 has a higher level of importance than that of the guard rail 1301.

Based on the determined levels of importance of the first and second objects, the controller 170 may control the vehicle drive apparatus 600 to avoid objects in an order of priority based on the levels of importance of the objects. For example, in the event that the vehicle 100 is unable to avoid all potential collisions with objects, then the vehicle 100 may be controlled to prioritize avoiding collisions with objects of higher importance, and limit any collisions to collisions with objects that have lower importance. As such, by controlling the vehicle drive apparatus 600, the controller 170 may control movement of the vehicle 100 to improve overall safety of those around the vehicle 100.

In the example of FIG. 13A, the controller 170 may determine that the guardrail 1301 has the lowest level of importance. As such, in the event that the vehicle 100 is unable to avoid all potential collisions with objects around the vehicle 100, the controller 170 may control the vehicle drive apparatus 600 to limit any collisions to a collision with the guard rail 1301.

If the vehicle 100 is not able to avoid collision with an object, the controller 170 may perform the safe driving task by controlling the vehicle 100 to limit any collision to a collision with an object having a relatively low level of importance. In this case, the safe driving task is a function of controlling the vehicle 100 to collide with an object having a relatively low level of importance when the vehicle 100 is not able to avoid collision with any object.

Figure 13B:
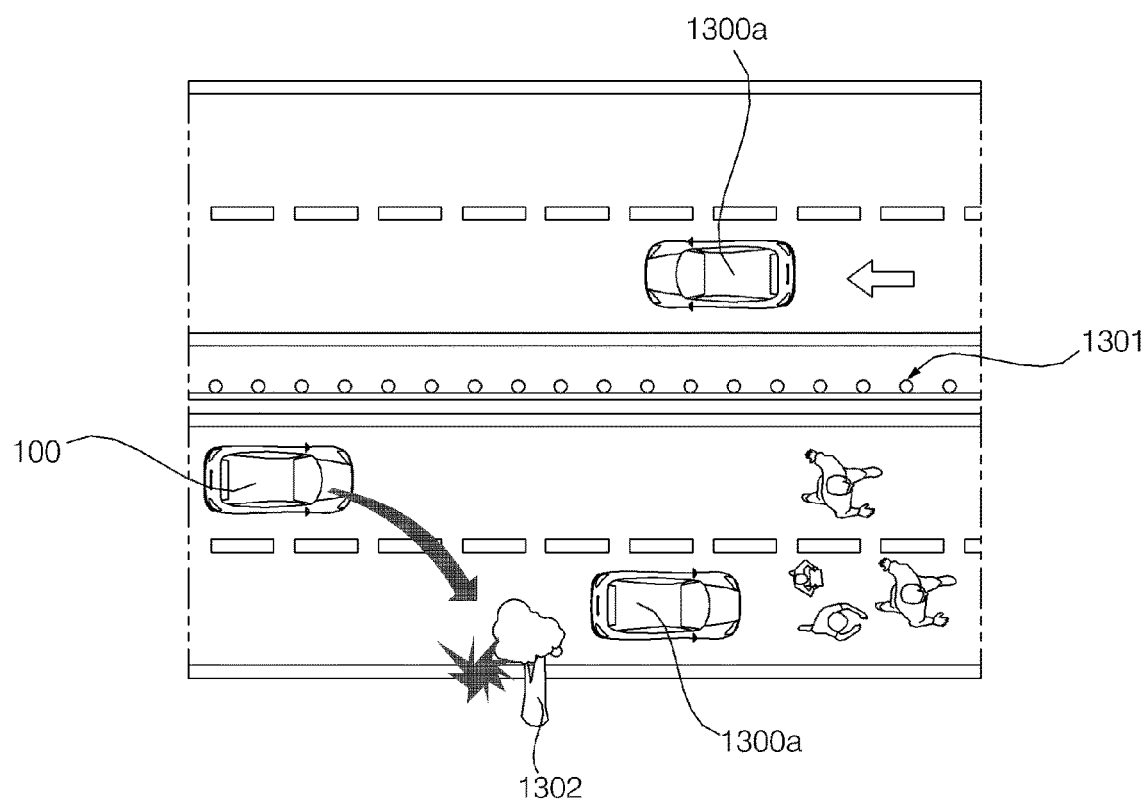

Referring to FIG. 13B, when first and second objects are all structures, and in the event that the vehicle 100 is unable to avoid potential collisions with both objects, the controller 170 may control the vehicle drive apparatus 600 to limit any collisions to a collision with one object selected between the first and second objects, wherein collision with the selected object is expected to deliver a less impact to the engine or battery of the vehicle 100 than collision with an object unselected between the first and second objects. The controller 170 may perform the safe driving task by controlling the vehicle drive apparatus 600 to deliver a relatively less impact to the engine or battery of the vehicle 100.

In a case where the vehicle 100 is about to inevitably collide with any one of the guardrail 1301, manned nearby vehicles 1300a 1300b, and a street tree 1302, the guardrail 1301 and the street tree 1302 have the same level of importance because the both are structures. The controller 170 may determine that collision with the street tree 1302 delivers a less impact to the engine or battery of the vehicle 100 than collision with the guardrail 1301. Accordingly, in the event that the vehicle 100 is unable to avoid potential collisions with all the objects, the controller 170 may control the vehicle drive apparatus 600 to limit any collisions with the vehicle 100 to a collision with the street tree 1302.

Figure 13C:
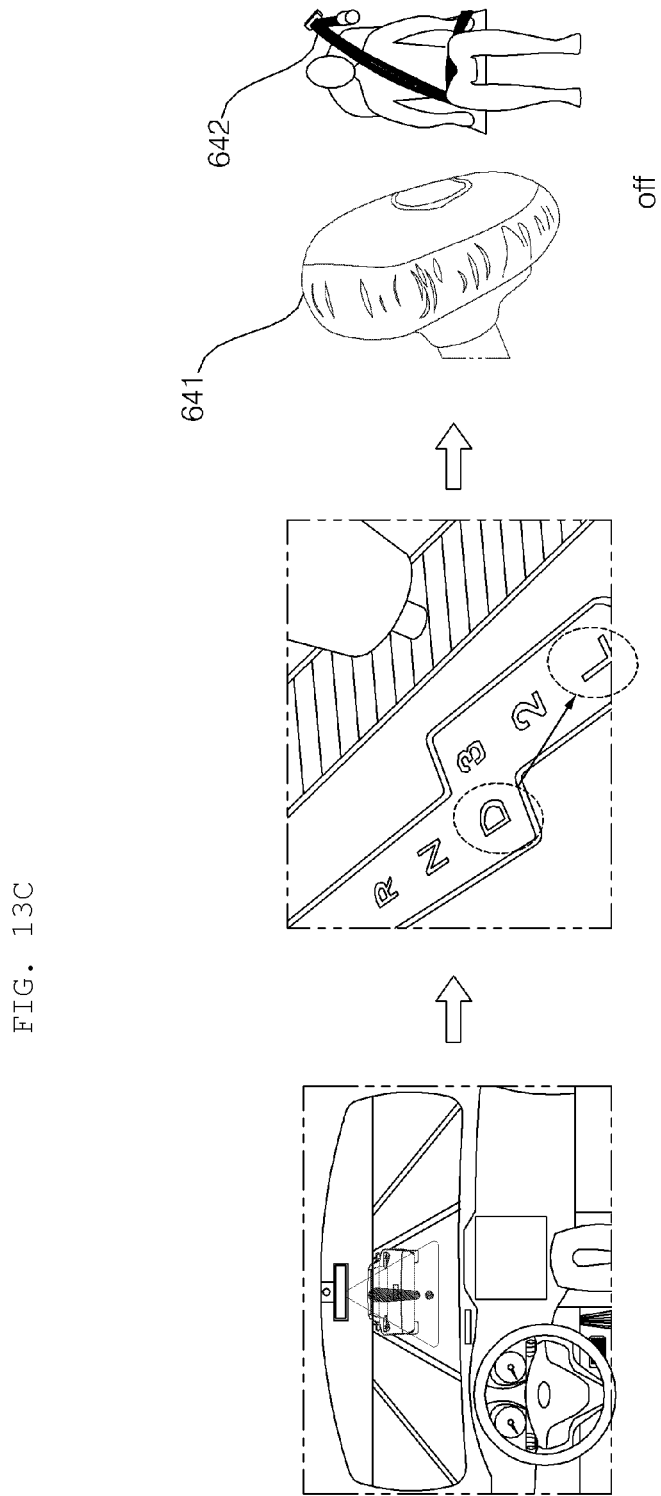

Referring to FIG. 13C, if the vehicle 100 is in the unmanned driving state and not able to avoid collision with an object, the controller 170 may control the vehicle drive apparatus 600 to operate an engine brake of the vehicle 100 and inactivate the safety apparatus drive unit 640.

The controller 170 may determine whether the vehicle 100 in the unmanned driving state is likely to collide with an object. The controller 170 may also determine whether the vehicle 100 is able to avoid the potential collision with the object.

If it is determined the vehicle 100 in the unmanned driving state is not able to avoid the potential collision with the object, the controller 170 may control the vehicle drive apparatus 600 to operate the engine brake of the vehicle 100. The engine brake is a braking system which utilizes a gear ratio of a transmission provided in the vehicle 100. The controller 170 or the driving system 710 may operate the engine brake by controlling the transmission drive unit 612 included in the vehicle drive apparatus 600.

If it is determined that the vehicle 100 is in the unmanned driving state and not able to avoid collision with an object, the controller 170 may inactivate the safety apparatus drive unknit 640. By operating the engine brake and inactivating the safety apparatus drive unit 640, the controller 170 may perform the safe driving task.

Figure 13D:
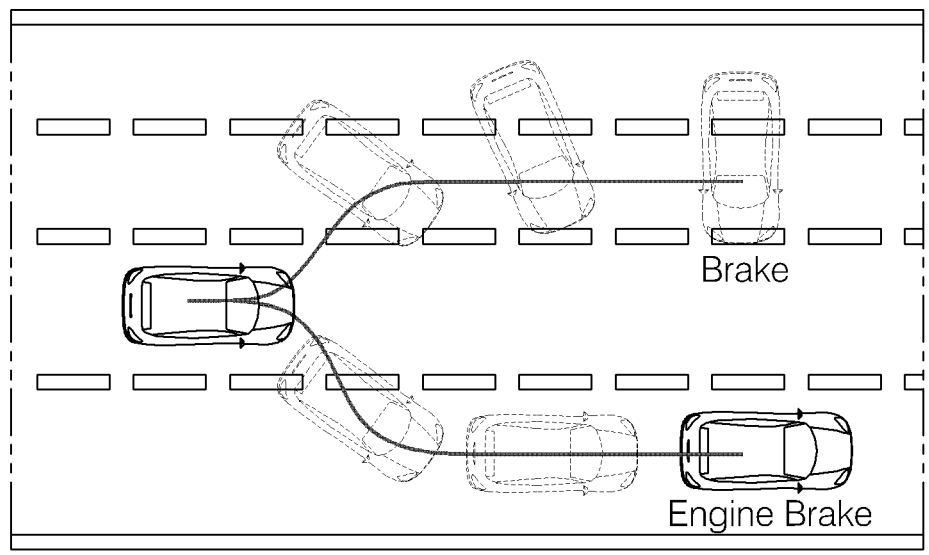

Referring to FIG. 13D, if it is determined, via the object detection apparatus 300 of the vehicle 100, that snow or liquid is present on a road on which the vehicle 100 is driving, the controller 170 may control the vehicle drive apparatus 600 to operate the engine when braking the vehicle 100.

Based on object information acquired via the object detection apparatus 300, the controller 170 may determine whether snow or liquid is present on the road on which the vehicle 100 is driving.

When the vehicle 100 is braked on a road on which snow or liquid is present, the vehicle 100 may slip. If an engine brake is used in such a case, the vehicle 100 may prevent the slipping.

If it is necessary to brake the vehicle 100 on the road on which snow or liquid is present, the controller 170 may control the vehicle drive unit 600 to operate the engine brake so as to prevent the vehicle 100 from slipping.

When the vehicle 100 needs to be braked on a road on which snow or liquid is present, the controller 170 may operate the engine brake as a way of performing the safe driving task.

Figure 14A:
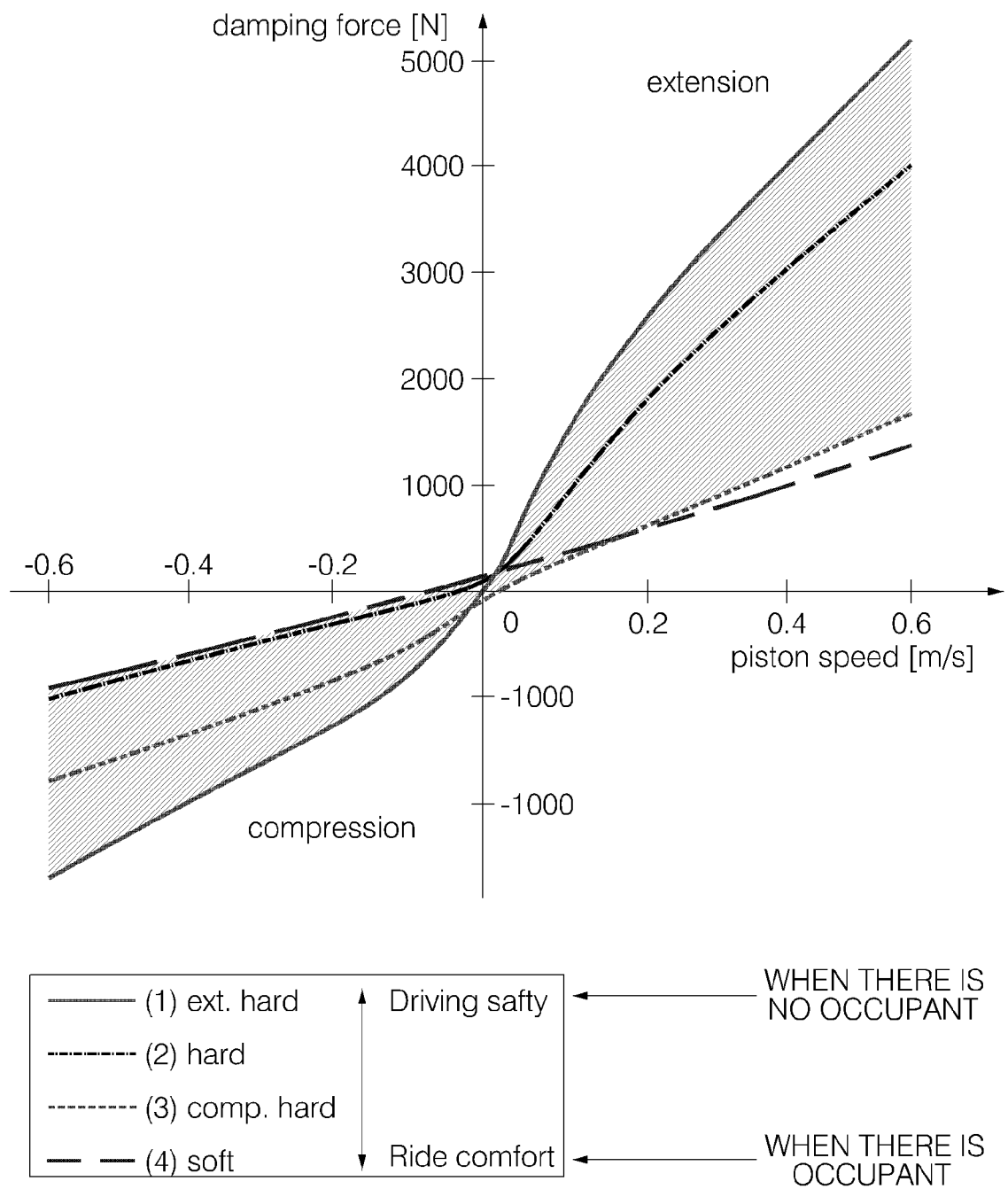
FIGS. 14A to 14C are diagrams illustrating an autonomous vehicle that performs a driving performance task.
Figure 14B:
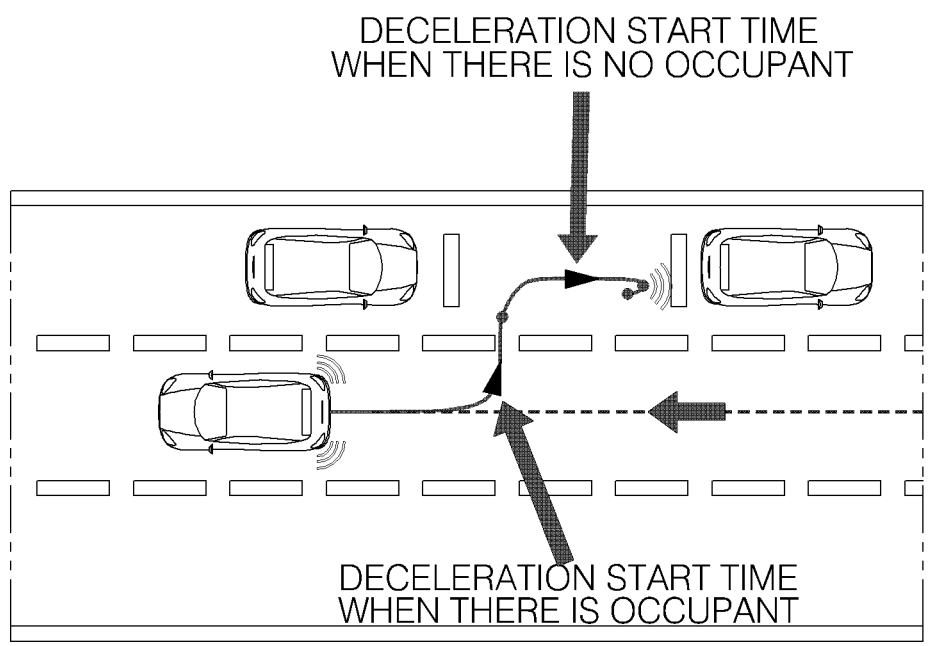
Figure 14C:
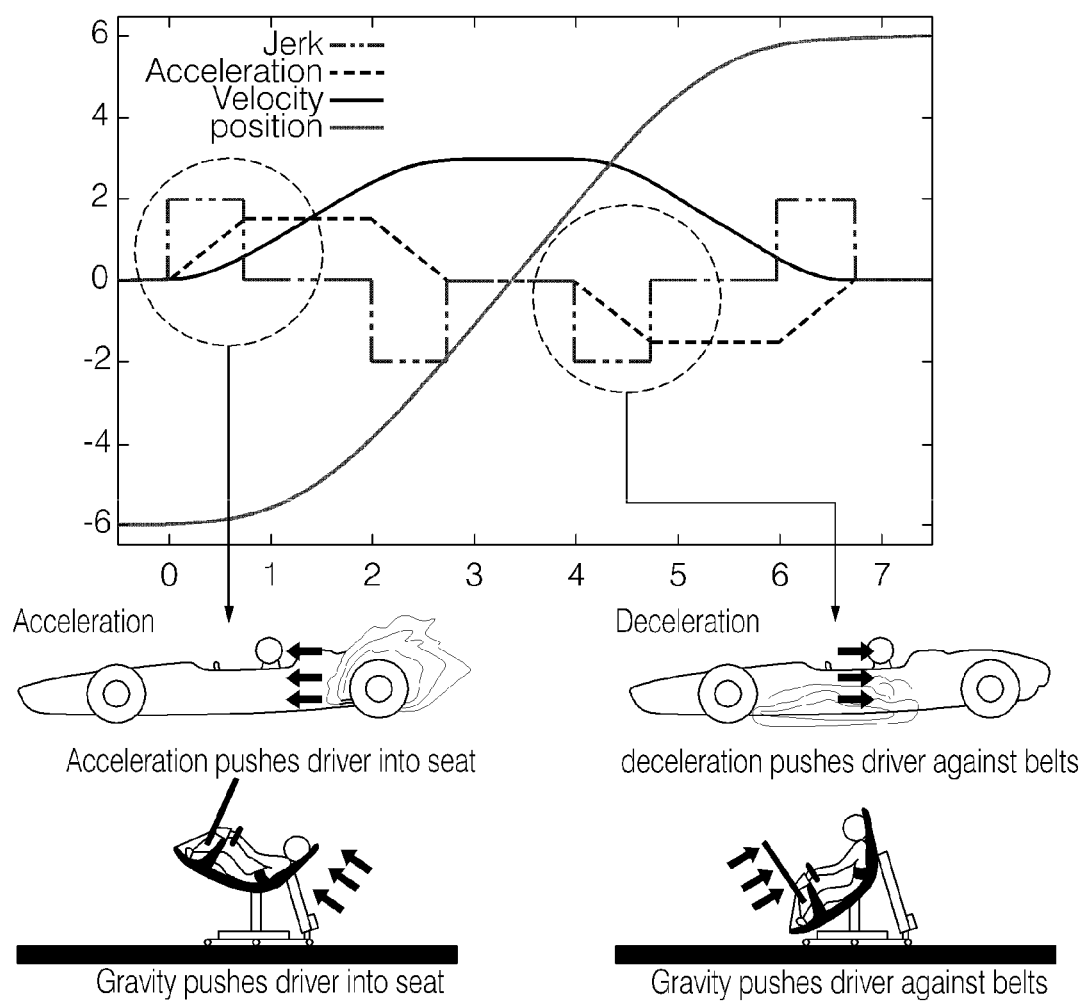

FIGS. 14A to 14C illustrate an autonomous vehicle that performs a driving performance task.

The controller 170 may control the suspension drive unit 623 so that, when there is no occupant in the vehicle 100, a suspension of the vehicle 100 is stiffer than a case where there is an occupant in the vehicle 100.

FIG. 14A is a graph illustrating an example relationship between damping force and piston speed of a suspension.

If the suspension is stiff, the magnitude of the damping force relative to the piston speed may be great. Thus, if the suspension is stiff, driving safety for the vehicle 100 may improve. On the other hand, if the suspension is soft, ride comport for the vehicle 100 may improve.

When there is an occupant in the vehicle 100, the controller 170 may reduce suspension stiffness of the vehicle 100 less stiff so as to improve ride comfort. When there is no occupant in the vehicle 100, the controller 170 may increase suspension stiffness of the vehicle 100 so as to improve driving safety. Therefore, if there is no occupant in the vehicle 100, a suspension of the vehicle 100 may be stiffer than a case where there is an occupant in the vehicle 100. As a result, if there is no occupant in the vehicle 100, driving safety may further improve than a case where there is an occupant in the vehicle 100.

The controller 170 may perform the driving performance task by controlling the suspension drive unit 623 so that, when there is no occupant in the vehicle 100, the suspension of the vehicle 100 is stiffer than a case where there is an occupant in the vehicle 100.

FIG. 14B shows a deceleration start time during automatic parking of a vehicle.

The controller 170 may control the vehicle drive apparatus 600 so that, when there is no occupant in the vehicle 100, the vehicle 100 starts deceleration at a later point in time during an automatic parking operation than a case where there is an occupant in the vehicle 100.

The controller 170 or the parking system 750 may control the vehicle 100 to perform an automatic parking operation. In this case, the vehicle 100 may be parked without control of a driver.

If the time to begin deceleration is set to be a late point in time in an automatic parking operation, the vehicle 100 decelerates late and therefore the parking speed of the vehicle 100 may improve. If there is no occupant in the vehicle 100 performing an automatic parking operation, the controller 170 or the parking system 750 may adjust the deceleration start time to a later point in time, thereby improving the parking speed of the vehicle 100.

If the time to begin deceleration is set to be at an early point in time in an automatic parking operation, the vehicle 100 decelerates early and therefore driving safety for the vehicle 100 may improve. If there is an occupant in the vehicle 100 performing the automatic parking operation, the controller 170 or the parking system 750 may adjust the deceleration start time of the vehicle 100 to an early point in time, thereby improving the driving safety for the vehicle 100.

The controller 170 may perform the driving performance task by controlling the vehicle drive apparatus 600 so that, when there is no occupant in the vehicle 100, the vehicle 100 starts deceleration at a later point in time during an automatic parking operation than a case where there is an occupant in the vehicle 100.

The controller 170 may control the vehicle drive apparatus 600 so that, when there is no occupant in the vehicle 100, the vehicle starts deceleration at a later point in time during an autonomous driving operation than a case where there is an occupant in the vehicle 100.

The controller 170 or the driving system 710 may control the vehicle 100 to drive autonomously. In this case, the vehicle 100 may drive without control of a driver.

If the time to begin deceleration is set to be at an early point in time in an autonomous driving operation, the vehicle 100 decelerates early and therefore driving safety for the vehicle 100 may improve. In this case, if there is an occupant in the vehicle 100, the occupant may feel a sense of incompatibility with early deceleration of the vehicle 100. By contrast, if there is no occupant in the vehicle 100 performing the autonomous driving operation, then it may not be necessary to compensate for such potential incompatibility. Thus, in some implementations, the controller 170 or the driving system 710 may adjust the deceleration start time of the vehicle 100 to an early point in time, thereby improving the safety of the vehicle 100.

The controller 170 may perform the driving performance task by controlling the vehicle drive apparatus 600 so that, when there is no occupant in the vehicle 100, the vehicle 100 starts deceleration at an earlier point in time during an autonomous driving operation than a case where there is an occupant in the vehicle 100.

Referring to FIG. 14C, when the vehicle 100 is acceleration or decelerating, a variation in speed per unit time may affect the ride comfort that an occupant of the vehicle 100 can feel.

A jerk value may degrade the ride of a seated occupant. If a change in a jerk value has a great absolute value, the ride comfort of the occupant of the vehicle 100 may be degraded. The jerk value may correspond to a speed variation per unit time of the vehicle 100.

If there is an occupant in the vehicle 100 which is accelerating or decelerating, the controller 170 may reduce a speed variation per unit time, thereby improving the ride comfort of the vehicle 100.

If a speed variation per unit time during acceleration or deceleration of the vehicle 100 is great, the ride comfort may be degraded but the speed of the vehicle may increase. Accordingly, when there is no occupant in the vehicle 100, the speed of the vehicle 100 may increase despite degradation of ride comfort.

The controller 170 may control the vehicle drive apparatus 600 so that, when there is no occupant in the vehicle 100, a speed variation per unit time during acceleration or deceleration of the vehicle 100 is greater than a case where there is an occupant in the vehicle 100.

The controller 170 may perform the driving performance task by controlling the vehicle drive apparatus 600 so that, when there is no occupant in the vehicle 100, a speed variation per unit time during acceleration or deceleration of the vehicle 100 is greater than a case where there is an occupant in the vehicle 100.

FIG. 15 illustrate an example method for an autonomous vehicle to control one or more in-vehicle devices.

When the vehicle 100 is autonomously driving in S100, the controller 170 may determine whether the vehicle 100 is in an unmanned driving state in S200. By determining, via the occupant sensing unit 240, whether there is an occupant in the vehicle 100, the controller 170 may determine whether the vehicle 100 is in the unmanned driving state. If the vehicle 100 is in the unmanned driving state, the controller 170 may perform at least one of a fuel efficiency task, an safe driving task, and a driving performance task in S300.

If it is determined that there is an occupant in the vehicle 100, the controller 170 may control at least in-vehicle device to be operated based on a location of the occupant in the vehicle 100 in S210.

For example, the controller 170 may activate at least one of the user interface apparatus 200, the driving manipulation apparatus 500, the safety apparatus derive unit 640, and the air-conditioner drive unit 660 based on a location of the occupant.

For example, the controller 170 may activate only a part of any one of the user interface 200, the safety apparatus drive unit, and the air-conditioner drive unit 660, the part which is associated to a seat at which the occupant is located. For example, if the occupant is located at a driver's seat, the controller 170 may activate the driving manipulating device 500.

The controller 170 determines whether the vehicle 100 is able to avoid collision with an object in S220. The controller 170 may determine a possibility for the vehicle 100 to collide with the object, based on object information acquired by the object detection apparatus 300 and a driving condition of the vehicle 100. If it is determined that the vehicle 100 is able to avoid the collision with the object, the controller 170 may control the vehicle 100 to avoid the object in S320.

If it is determined that the vehicle 100 is not able to avoid collision with the object, the controller 170 may adjust the direction of collision with the object based on a location of the occupant in S310. The controller 170 may control the vehicle drive apparatus 600 to adjust the direction of collision with the object.

For example, in order to minimize an impact to be delivered to an occupant, the controller 170 may adjust a direction of collision with an object based on a location of the occupant in the vehicle 100. For example, when an occupant is located on the right side in the vehicle 100, the controller 170 may control the vehicle 100 so that the left side of the vehicle 100 collides with the object.

Figure 16:
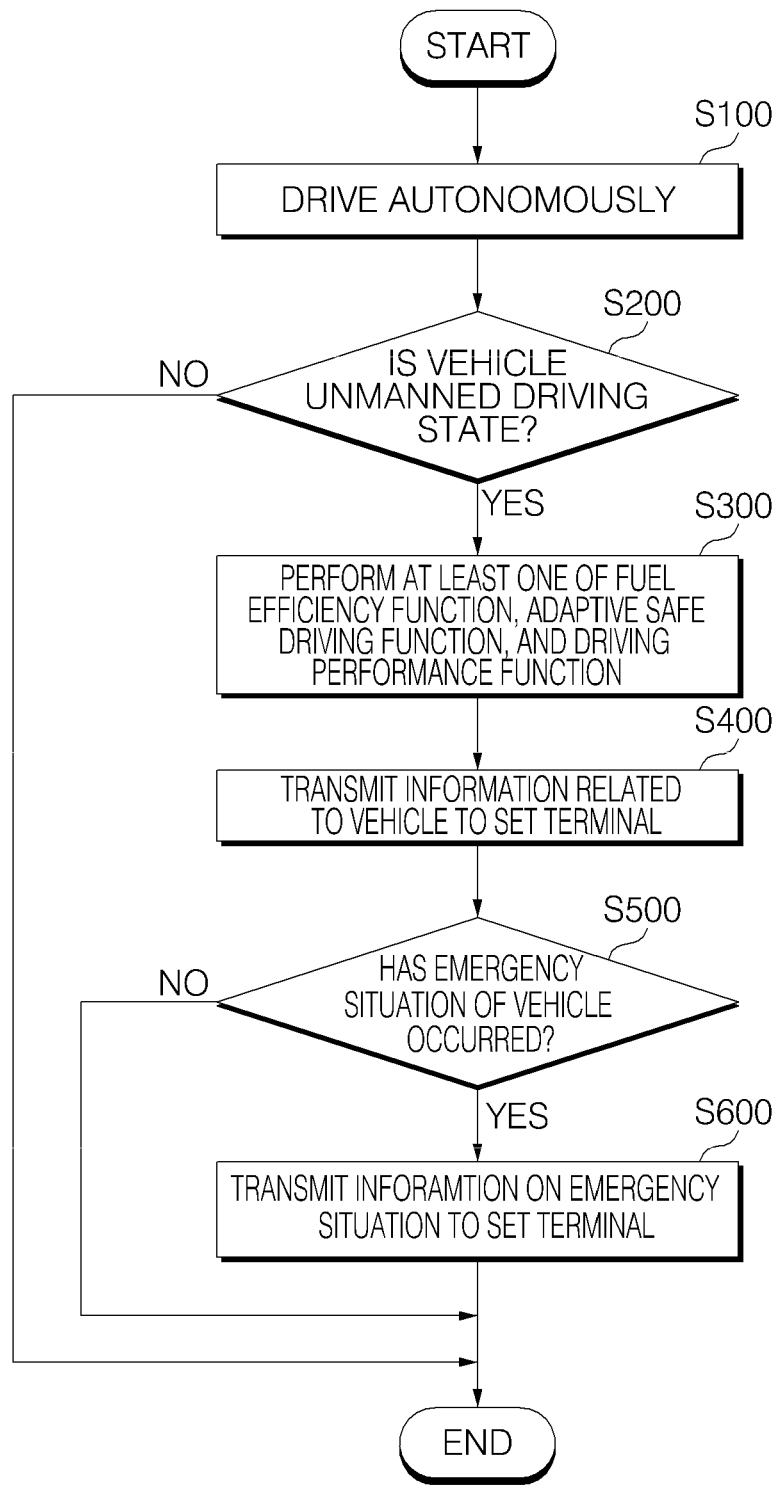
FIG. 16 is a flowchart illustrating an example method for an autonomous vehicle to communicate with a set terminal.

FIG. 16 illustrate an example method for an autonomous vehicle to communicate with a set terminal.

When the vehicle 100 is autonomously driving in S100, the controller 170 may determine whether the vehicle 100 is in an unmanned driving state in S200. By determining, via the occupant sensing unit 240, whether there is an occupant in the vehicle 100, the controller 170 may determine whether the vehicle 100 is in the unmanned driving state. When the vehicle 100 is in the unmanned driving state, the controller 170 may perform at least one of the fuel efficiency task, the safe driving task, and the driving performance task in S300.

When the vehicle 100 is in the unmanned driving state, the controller 170 may transmit information on at least one of a location, a driving condition, a route, and a driving environment of the vehicle 100 to a set terminal via the communication apparatus 400 provided in the vehicle 100 in S400.

The set terminal may display the information on at least one of the location, the driving condition, the route, and the driving environment of the vehicle 100. Accordingly, a user may be able to monitor the vehicle 100 which is in the unmanned driving state.

The controller 170 may determine whether an emergency situation of the vehicle 100 has occurred in S500. For example, the emergency situation may be collision of the vehicle 100 with an object, fire inside the vehicle 100, and an accident in the vicinity of the vehicle 100.

When an emergency situation of the vehicle 100 has occurred, the controller 170 may transmit information on the emergency situation to the set terminal in S600.

The information on the emergency situation may be information on description, occurrence time, and a location of the emergency situation.

Figure 17:
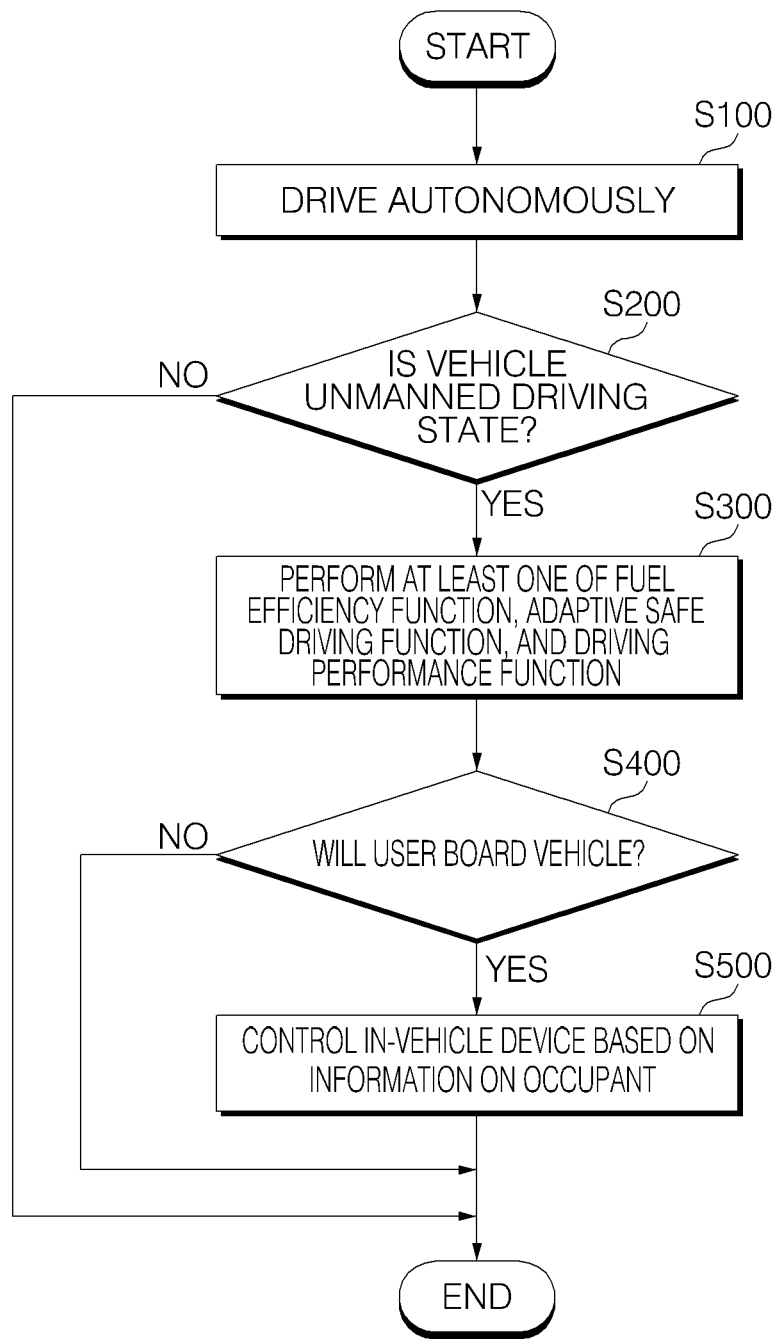
FIG. 17 is a flowchart illustrating another example method for an autonomous vehicle to control one or more in-vehicle devices.

FIG. 17 illustrate another example method for an autonomous vehicle to control one or more in-vehicle devices.

When the vehicle 100 is autonomously driving in S100, the controller 170 may determine whether the vehicle 100 is in an unmanned driving state in S200. By determining, via the occupant sensing unit 240, whether there is an occupant in the vehicle 100, the controller 170 may determine whether the vehicle 100 is in the unmanned driving state. If the vehicle 100 is in the unmanned driving state, the controller 170 may perform at least one of the fuel efficiency task, the safe driving task, and the driving performance task in S300.

The controller 170 may determine whether a user will board the vehicle 100 in S400. The controller 170 may determine when and where the user will board the vehicle 100, based on a call signal transmitted by a set terminal or preset boarding schedule information.

If it is determined that the user will board the vehicle 100, the controller 170 may, in S500, control at least one in-vehicle device among the user interface apparatus 200, the driving manipulation apparatus 500, the air-conditioner drive unit 660, the wiper drive unit 633, and the side mirror drive unit 634, based on information on at least one of a boarding time, a set temperature, and a boarding location.

For example, if it is determined that a user will board the vehicle 100 in ten minutes, the controller 170 may control the air-conditioner drive unit 660 to adjust inner temperature of the vehicle 100 to the set temperature.

Figure 18:
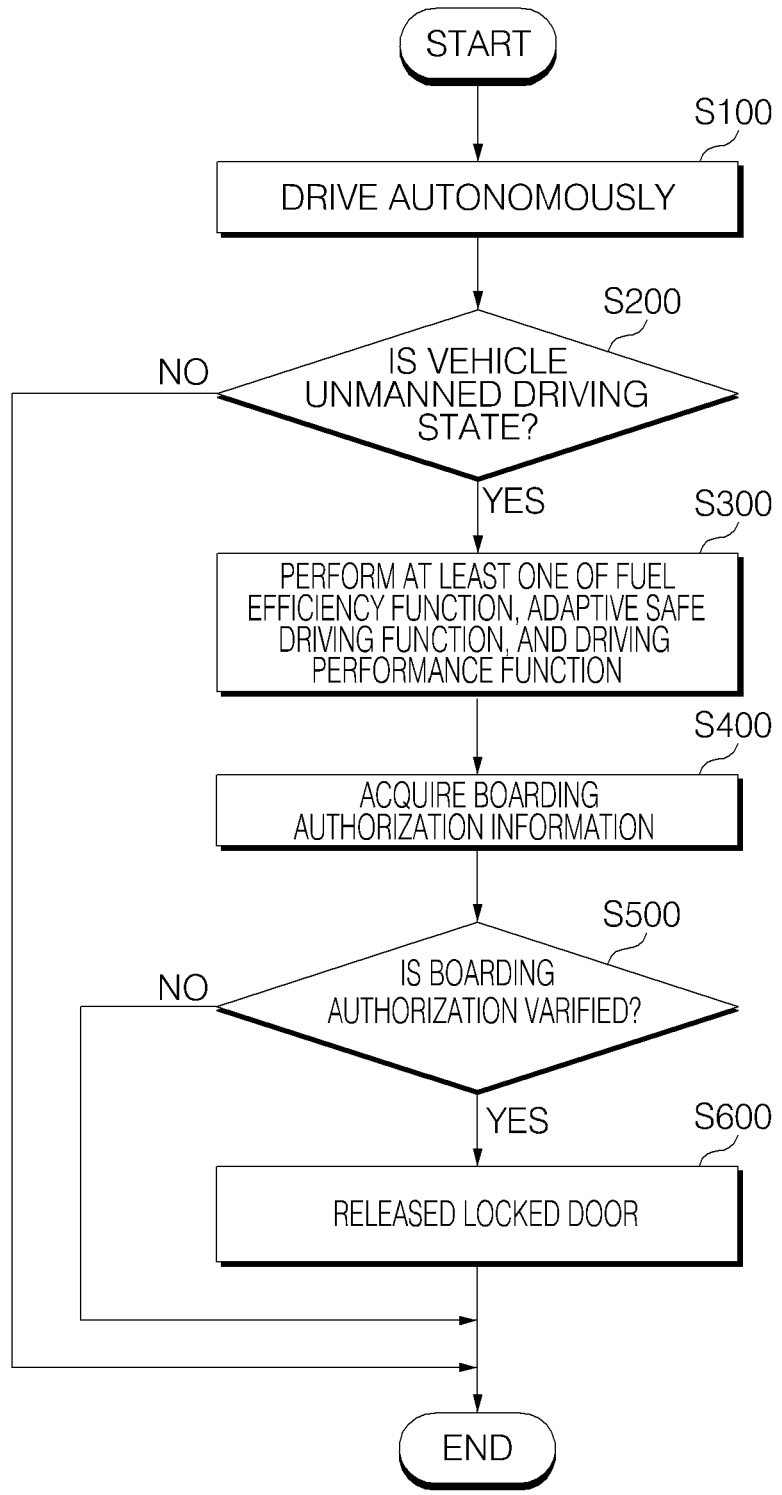
FIG. 18 is a flowchart illustrating an example method for an autonomous vehicle to release a locked door.

FIG. 18 illustrate an example method for an autonomous vehicle to release a locked door.

When the vehicle 100 is autonomously driving in S100, the controller 170 may determine whether the vehicle 100 is in an unmanned driving state in S200. By determining, via the occupant sensing unit 240, whether there is an occupant in the vehicle, the controller 170 may determine whether the vehicle 100 in the unmanned driving state. If it is determined that the vehicle 100 is in the unmanned driving state, the controller 100 may perform at least one of the fuel efficiency task, the safe driving task, and the driving performance task in S300.

In S400, the controller 170 may acquire boarding authorization information via the user interface apparatus 200 or the communication apparatus 400 which is provided in the vehicle 100.

For example, the controller 170 may acquire a user's biometric information received through the user interface apparatus 200 as boarding authorization information. For example, the controller 170 may acquire information received through the communication apparatus 400 as boarding authorization information.

The boarding authorization information is information used to verify the authorization to board the vehicle 100. For example, the boarding authorization information may include finger print information, iris information, an image of a face, and a password used to verify the right to use.

The controller 170 may determine whether a user's authorization to board the vehicle 100 is verified, based on acquired boarding authorization information in S500.

For example, the controller 170 may determine whether the authorization to board the vehicle 100 is verified, by comparing acquired boarding authorization information with pre-stored boarding authorization information of an authentic user.

If a user's authorization to board the vehicle 100 is verified, the controller 170 may control the door drive unit 631 of the vehicle 100 to release a locked door of the vehicle 100 in S600.

Accordingly, if the user's authorization to board the vehicle 100 is verified, the user is able to open the door of the vehicle 100.

If the user boards the vehicle 100 and sits on a driver's seat, the controller 170 may output a menu to the output unit 250 to check whether the user wants to switch the vehicle 100 to a manual driving mode.

The controller 170 may determine whether the user is able to drive, based on driving authorization information or driver condition information which is acquired via the user interface apparatus 200 or the communication apparatus 400.

The driving authorization information is information indicating whether the user has authorization to drive the vehicle 100. For example, the user may input driving license information as driving authorization information.

The driver condition information may indicate physical condition of the driver, for example whether the user requests a manual driving mode, whether the user has a driving license, whether the user is physically impaired (e.g., drunk), etc.

For example, if it is determined that the user has a driving license and is not drunk, then the controller 170 may determine that the user is able to drive.

If it is determined that the user is able to drive, the controller 170 may switch the vehicle 100 to the manual driving mode.

Figure 19:
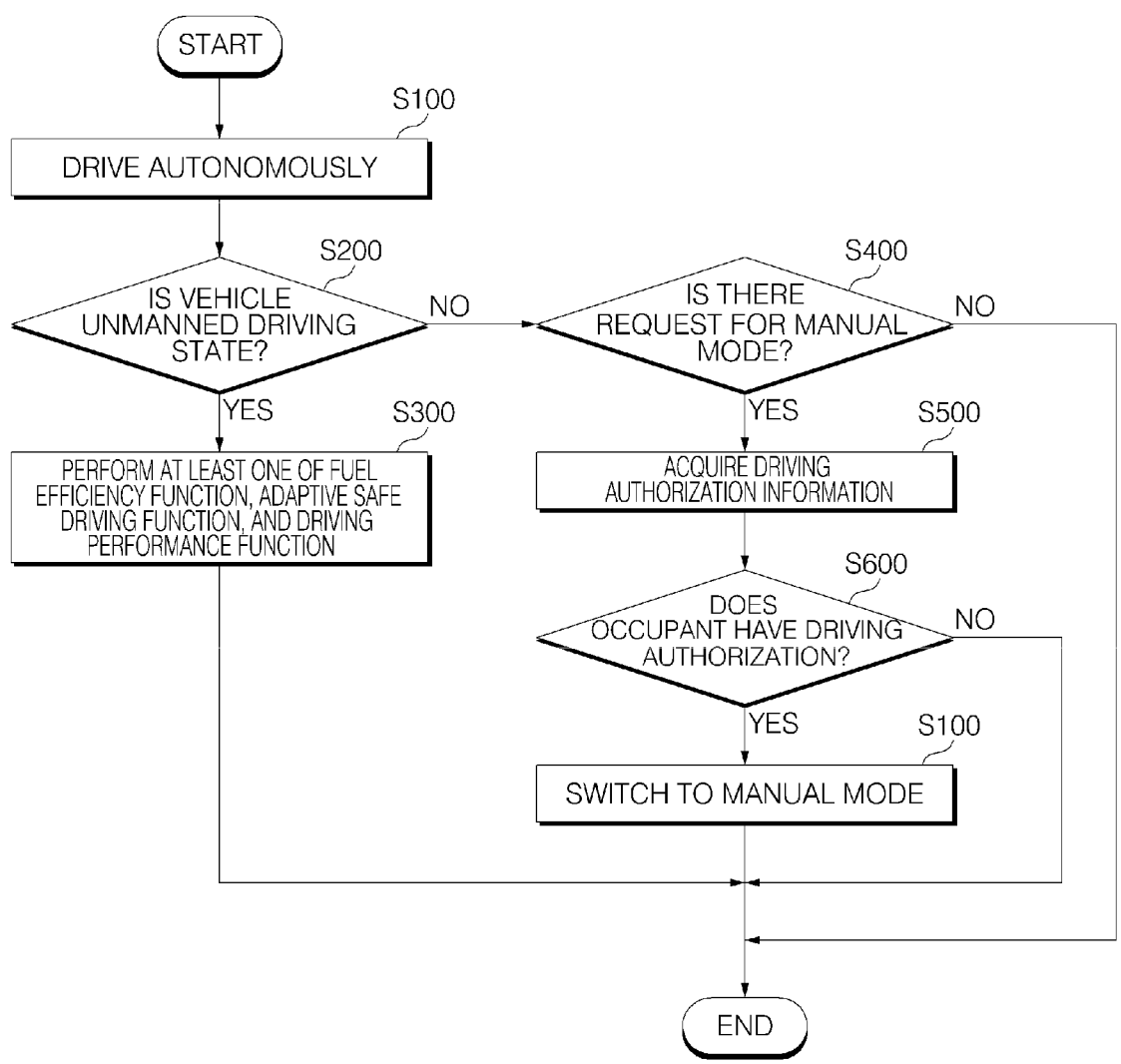
FIG. 19 is a flowchart illustrating an example method for an autonomous vehicle to switch between an autonomous driving mode and a manual driving mode.

FIG. 19 illustrate an example method for an autonomous vehicle to switch between an autonomous driving mode and a manual driving mode.

When the vehicle 100 is autonomously driving in S100, the controller 170 may determine whether the vehicle 100 is in an unmanned driving state in S200. By determining, via the occupant sensing unit 240, whether there is an occupant in the vehicle 100, the controller 170 may determine whether the vehicle 100 is in the unmanned driving state. When the vehicle 100 is in the unmanned driving state, the controller 170 may perform at least one of the fuel efficiency task, the safe driving task, and the driving performance task in S300.

If there is an occupant in the vehicle 100, the controller 170 may determine whether a request for a manual driving mode is received from the occupant via the user interface apparatus 200 of the vehicle 100 in S400.

When the request for a manual driving mode is received from the occupant, the controller 170 may acquire driving authorization information or driver condition information via the user interface apparatus 200 or the communication apparatus 400 in S500.

In 600, the controller 170 may determine whether the occupant is able to drive, based on the driving authorization information or the driver condition information.

If it is determined that the occupant is able to drive, the controller 170 may switch the vehicle 100 to the manual driving mode in S700.

The examples described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller.

The examples described above can be modified. In particular, various variations and modifications can be made in the component parts and/or arrangements of the subject combination arrangement. In addition to variations and modifications in the component parts and/or arrangements, any suitable alternatives in the component parts and/or arrangements are possible.

The invention claimed is:

1. A vehicle that operates in an autonomous driving mode, the vehicle comprising:
    a sensor that is configured to sense an occupant inside the vehicle; and
    at least one processor configured to:
        determine, through the sensor, whether the vehicle is occupied,
        in a state in which the vehicle operates in the autonomous driving mode, control one or more in-vehicle devices based on a determination of whether the vehicle is occupied,
        control a speed variation per unit time during an accelerating operation or a decelerating operation of the vehicle based on the determination of whether the vehicle is occupied,
        in a state in which the vehicle is occupied, control the speed variation per unit time to a first speed variation per unit time of the accelerating operation or the decelerating operation, the first speed variation per unit time being less than a second speed variation per unit time of the accelerating operation or the decelerating operation in a state in which the vehicle is unoccupied,
        based on the determination of whether the vehicle is occupied, control a timing of the decelerating operation according to each of the autonomous driving mode and an automatic parking mode of the vehicle,
control the timing of the decelerating operation to a first timing in a state in which the vehicle is in the automatic parking mode and is occupied,
control the timing of the decelerating operation to a second timing in a state in which the vehicle is in the automatic parking mode and is unoccupied, the first timing being earlier than the second timing,
control the timing of the decelerating operation to a third timing in a state in which the vehicle operates in the autonomous driving mode and is occupied, and
control the timing of the decelerating operation to a fourth timing in a state in which the vehicle operates in the autonomous driving mode and is unoccupied, the third timing being later than the fourth timing.

2. The vehicle of claim 1, wherein the at least one processor is configured to:
based on a determination that the vehicle is in an unmanned driving state in which the vehicle operates in the autonomous driving mode and the vehicle is not occupied, operate the one or more in-vehicle devices according to the unmanned driving state.

3. The vehicle of claim 2, wherein the at least one processor is configured to:
based on the vehicle being in the unmanned driving state, control the one or more in-vehicle devices to perform at least one of a fuel efficiency task, a safe driving task, or a driving performance task.

4. The vehicle of claim 3, wherein the at least one processor is configured to:
based on the vehicle being in the unmanned driving state, deactivate at least one in-vehicle device among the one or more in-vehicle devices based on a determination of whether the vehicle is occupied, the at least one in-vehicle device comprising at least one of: a user interface apparatus, a driving manipulation apparatus, a safety apparatus drive unit, a lamp drive unit, an air-conditioner drive unit, a wiper drive unit, a side mirror drive unit, or an electronic control suspension,
wherein the at least one processor is configured to:
perform the fuel efficiency task by deactivating at least one of the user interface apparatus, the driving manipulation apparatus, the lamp drive unit, the air-conditioner drive unit, the wiper drive unit, the side mirror drive unit, or the electronic control suspension; and
perform the safe driving task by deactivating the safety apparatus drive unit.

5. The vehicle of claim 3, wherein the at least one processor is configured to:
based on the vehicle being in the unmanned driving state, control at least one of a light intensity or an irradiation range of at least one lamp of the vehicle based on a sensing range of one or more sensors of the vehicle.

6. The vehicle of claim 3, wherein the at least one processor is configured to:
based on the vehicle being in the unmanned driving state, control an intervention rate of a regenerative brake system of the vehicle.

7. The vehicle of claim 3, wherein the at least one processor is configured to:
based on the vehicle being in the unmanned driving state, control an Adaptive Cruise Control speed of the vehicle to operate the vehicle at engine RPM values for which a fuel consumption of the vehicle satisfies a threshold value.

8. The vehicle of claim 3, wherein the at least one processor is configured to:
determine that the vehicle is likely to collide with at least one of a first object or a second object based on object information acquired by an object detection apparatus of the vehicle and a driving condition of the vehicle; and
based on the vehicle being in the unmanned driving state and based on a determination that the vehicle is likely to collide with at least one of the first object or the second object, determine a first importance level for the first object and a second importance level for the second object according to types of the first object and the second object; and
control the vehicle to prioritize avoiding colliding with the first object over the second object based on the first importance level being greater than the second importance level.

9. The vehicle of claim 8, wherein the at least one processor is configured to:
based on the first importance level of the first object being the same as the second importance level of the second object, control the vehicle to prioritize avoiding colliding with the first object over the second object based on a determination that colliding with the first object will cause a first impact to an engine or battery of the vehicle that is greater than a second impact to the engine or battery caused by colliding with the second object.

10. The vehicle of claim 3, wherein the at least one processor is configured to:
based on the vehicle being in the unmanned driving state and based on a determination that the vehicle is unable to avoid a collision with an object, control the vehicle to operate an engine brake of the vehicle and to deactivate a safety apparatus drive unit of the vehicle;
determine, by an object detection apparatus, that snow or liquid is present on a road on which the vehicle travels; and
based on the vehicle being in the unmanned driving state and based on a determination that snow or liquid is present on the road on which the vehicle travels, control the vehicle to operate the engine brake of the vehicle.

11. The vehicle of claim 3, wherein the at least one processor is configured to:
based on a determination that the vehicle is occupied, control a suspension of the vehicle to be a first suspension level that is more flexible than a second suspension level corresponding to the vehicle being unoccupied.

12. The vehicle of claim 3, wherein the at least one processor is configured to:
based on the vehicle being in the unmanned driving state, transmit, to an external terminal, information regarding at least one of a location, a driving condition, a route, or a driving environment of the vehicle; and
based on a determination of an emergency situation of the vehicle, transmit, to the external terminal, information regarding the emergency situation.

13. The vehicle of claim 3, wherein the at least one processor is configured to:
based on the vehicle being in the unmanned driving state, and based on a determination that a user is likely to board the vehicle:

perform a first control operation of at least one of the one or more in-vehicle devices comprising a user interface apparatus, a driving manipulation apparatus, an air-conditioner drive unit, a wiper drive unit, or a side mirror drive unit, wherein the first control operation is based on at least one of an estimated boarding time of the user, a preset temperature for the user, or a boarding location of the user.

14. The vehicle of claim 3, wherein the at least one processor is configured to:
based on the vehicle being in the unmanned driving state, control the vehicle to unlock a locked door of the vehicle based on a determination that a first user is authorized to board the vehicle according to boarding authorization information acquired through a user interface apparatus or a communication apparatus of the vehicle.

15. The vehicle of claim 3, further comprising:
an output unit configured to display information,
wherein the at least one processor is configured to:
in the state in which the vehicle operates in the autonomous driving mode and based on a determination that the vehicle is occupied by a first user sitting in a driver's seat of the vehicle, control the output unit to display a query asking whether to switch from the autonomous driving mode to a manual driving mode; and
based on receiving an input to switch from the autonomous driving mode to the manual driving mode:
determine whether the first user is allowed to drive based on at least one of driving authorization information indicating whether the first user is authorized to drive the vehicle, or driving condition information indicating a physical condition of the first user; and
based on a determination that the first user is allowed to drive, switch from the autonomous driving mode to the manual driving mode.

16. The vehicle of claim 3, wherein the at least one processor is configured to:
determine that the vehicle is likely to collide with one or more objects based on a travelling direction of the vehicle, a speed of the vehicle, or road conditions.

17. The vehicle of claim 1, wherein the at least one processor is configured to:
based on a determination that the vehicle is occupied:
control the one or more in-vehicle devices based on a location of an occupant inside the vehicle; and
activate at least one of a user interface apparatus, a driving manipulation apparatus, a safety apparatus drive unit, or an air-conditioner drive unit based on the location of the occupant inside the vehicle.

18. The vehicle of claim 17, wherein the at least one processor is configured to:
based on the determination that the vehicle is occupied and based on a determination that the vehicle is unable to avoid a collision with an object, adjust a traveling direction of the vehicle based on the location of the occupant inside the vehicle.

19. The vehicle of claim 1, wherein the sensor includes a camera or a biometric sensor.

* * * * *